US012410725B1

(12) United States Patent
Freeman et al.

(10) Patent No.: US 12,410,725 B1
(45) Date of Patent: Sep. 9, 2025

(54) TURBINE SHROUD ASSEMBLIES WITH AIR ACTIVATED PISTONS FOR BIASING BUFFER CAVITY SEALS

(71) Applicant: Rolls-Royce Corporation, Indianapolis, IN (US)

(72) Inventors: Ted J. Freeman, Indianapolis, IN (US); Aaron D. Sippel, Indianapolis, IN (US); David J. Thomas, Indianapolis, IN (US); Clark J. Snyder, Indianapolis, IN (US); Grant Cook, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/680,758

(22) Filed: May 31, 2024

(51) Int. Cl.
*F01D 11/08* (2006.01)

(52) U.S. Cl.
CPC .......... *F01D 11/08* (2013.01); *F05D 2230/60* (2013.01); *F05D 2240/11* (2013.01); *F05D 2240/55* (2013.01); *F05D 2260/30* (2013.01)

(58) Field of Classification Search
CPC ........ F01D 11/04; F01D 11/005; F01D 11/08; F01D 11/10; F01D 11/14; F02C 7/28; F05D 2240/11; F05D 2240/55; F05D 2260/30; F05D 2230/60
See application file for complete search history.

(56) References Cited

U.S. PATENT DOCUMENTS 7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 4/2014 Martin et al.
8,784,041 B2 7/2014 Durocher et al.
8,845,285 B2 9/2014 Weber et al.
8,905,708 B2 12/2014 Weber et al.
9,079,245 B2 7/2015 Durocher et al.
9,534,500 B2 1/2017 Bouchard et al.
9,708,922 B1 7/2017 Davis et al.
9,714,580 B2 7/2017 Slavens et al.
9,745,854 B2 8/2017 Baldiga et al.
(Continued)

FOREIGN PATENT DOCUMENTS

EP 1965031 A2 9/2008
EP 3543468 A1 9/2019
FR 3056636 A1 3/2018

*Primary Examiner* — Elton K Wong
(74) *Attorney, Agent, or Firm* — Barnes & Thornburg

(57) ABSTRACT

A turbine shroud assembly for use with a gas turbine engine includes a carrier segment, a blade track segment, and a seal system. The carrier segment arranged circumferentially at least partway around an axis. The blade track segment is coupled to the carrier segment and defines a portion of a gas path of the gas turbine engine. The seal system is arranged radially between the carrier segment and the blade track segment to block gases from flowing between the carrier segment and the blade track segment.

17 Claims, 11 Drawing Sheets

(56) References Cited

U.S. PATENT DOCUMENTS

| | | | |
|---|---|---|---|
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 | 10/2019 | Sippel et al. |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2005/0220611 | A1* | 10/2005 | Bhate ........................ F16J 15/46 415/173.3 |
| 2016/0348527 | A1* | 12/2016 | Vetters .................. F01D 25/246 |
| 2018/0298773 | A1* | 10/2018 | Vetters .................. F01D 11/005 |
| 2022/0025819 | A1* | 1/2022 | Ha ............................ F01D 9/04 |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

TURBINE SHROUD ASSEMBLIES WITH AIR ACTIVATED PISTONS FOR BIASING BUFFER CAVITY SEALS

FIELD OF THE DISCLOSURE

The present disclosure relates generally to turbine shroud assemblies, and more specifically to sealing of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, sealing between and coupling such components may present challenges.

SUMMARY

The present disclosure may comprise one or more of the following features and combinations thereof.

A turbine shroud assembly adapted for use with a gas turbine engine may include a carrier segment, a blade track segment, and a seal system. The carrier segment may be arranged circumferentially at least partway around an axis. The blade track segment may be arranged circumferentially at least partway around the axis to define a portion of a gas path of the gas turbine engine. The seal system may be arranged radially between the carrier segment and the blade track segment to block gases from flowing between the carrier segment and the blade track segment.

In some embodiments, the carrier segment may include an outer wall, a first support wall, and a second support wall. The first support wall may extend radially inward from the outer wall. The second support wall may extend radially inward from the outer wall at a location spaced apart axially from the first support wall to define an attachment-receiving space. The first support wall may be formed to include a radially-inwardly opening first channel that extends circumferentially relative to the axis and at least one buffer air passageway that extends radially into the forward support wall and opens into the first channel.

In some embodiments, the blade track segment may include a shroud wall and an attachment feature. The shroud wall may extend circumferentially partway around the axis. The attachment feature may extend radially outward from the shroud wall into the attachment-receiving space formed in the carrier segment.

In some embodiments, the seal system may include a buffer air seal assembly arranged in the first channel between the forward support wall of the carrier segment and the shroud wall of the blade track segment to block gases from flowing between the carrier segment and the blade track segment. The buffer air seal assembly may include a seal. The seal may extend circumferentially relative to the axis and axially across the first channel.

In some embodiments, the at least one buffer air passageway may be configured to discharge buffer air radially inward away from the carrier segment into the first channel. The at least one buffer air passageway may be configured to discharge buffer air radially inward away from the carrier segment into the first channel to urge the seal radially inward into engagement with the shroud wall of the blade track segment.

In some embodiments, the buffer air seal assembly may further include a bias member. The bias member may be compressed radially between the carrier segment and the seal to apply a bias force to the seal to bias the seal radially inward towards the shroud wall of the blade track segment.

In some embodiments, the seal may be formed to include an inner groove and at least on through hole. The inner groove may extend radially inward into the seal and circumferentially relative to the axis. The at least one through hole may extend radially through the seal and opens into the inner groove to allow the buffer air to flow through the seal into the inner groove.

In some embodiments, the seal may include a first seal member and a second seal member. The second seal member may be coupled to the first seal member for movement therewith.

In some embodiments, the first seal member may have a rectangular cross-sectional shape when viewed in the circumferential direction. The rectangular cross-sectional shape of the first seal member may define an inner surface engaged with the shroud wall of the blade track segment, an outer surface spaced apart radially from the inner surface, and two side surfaces spaced apart axially that extend radially between the inner surface and the outer surface. The second seal member may be arranged axially between a first side surface of the first seal member and the carrier segment.

In some embodiments, the first seal member may be formed to include a side groove. The side groove may extend axially into a first side surface of the first seal member and circumferentially relative to the axis. The second seal member may be arranged in the side groove and engage the carrier segment in the first channel.

In some embodiments, the first seal member may be formed to include an inner groove and at least one through hole. The inner groove may extend radially into the inner surface of the first seal member and circumferentially relative to the axis. The at least one through hole may extend radially through the first seal member and opens into the inner groove to allow the buffer air to flow through the first seal member into the inner groove.

In some embodiments, the seal may include an outer seal member, a forward seal member, and an aft seal member. The forward seal member may extend radially inward from the outer seal member, and an aft seal member that extends radially inward from the outer seal member, the aft seal member spaced apart axially from the forward seal member to define an inner groove therebetween, and the outer seal member, the forward seal member, and aft seal member are free to move relative to each other.

In some embodiments, the outer seal member may be formed to include at least one through hole that extends radially through the outer seal member and opens into the inner groove. The outer seal member may be formed to include at least one through hole that extends radially through the outer seal member and opens into the inner groove to allow the buffer air to flow through the outer seal member into the inner groove to urge the forward seal member axially forward and the aft seal member axially aft into engagement with the carrier segment.

In some embodiments, the seal may include a first seal member and a second seal member coupled to the first seal member for movement therewith. The first seal member may have a rectangular cross-sectional shape when viewed in the circumferential direction that defines an inner surface, an outer surface spaced apart radially from the inner surface, and two side surfaces spaced apart axially that extend radially between the inner surface and the outer surface. The second seal member may extend around a portion of the first seal member so that the second seal member engages the carrier segment and the blade track segment.

In some embodiments, the first seal member may be formed to include an inner groove and at least one through hole. The inner groove may extend radially into the inner surface of the first seal member and circumferentially relative to the axis. The at least one through hole may extend radially through the first seal member and opens into the inner groove to allow the buffer air to flow through the first seal member into the inner groove. In some embodiments, the first channel may have a rectangular cross-sectional shape viewed circumferentially relative to the axis.

In some embodiments, the first channel may define a first end surface, a first support-wall surface, and a second support-wall surface. The first support-wall surface may extend radially inward from the first end surface. The second support-wall surface may extend radially inward from the first end surface at a location spaced apart axially from the first support-wall surface.

According to another aspect of the present disclosure, a method may include providing a carrier segment arranged circumferentially at least partway around an axis. The carrier segment may be formed to include a radially-inwardly opening first channel and at least one buffer air passageway that extends radially into the carrier segment.

In some embodiments, the method may further include providing a blade track segment arranged circumferentially at least partway around the axis. The blade track segment may have a shroud wall that extends circumferentially partway around the axis and an attachment feature that extends radially outward from the shroud wall. The shroud wall may be formed to include a radially-outwardly opening second channel.

In some embodiments, the method may further include providing a buffer air seal assembly. The buffer air seal assembly may include a seal that extends circumferentially relative to the axis and at least one bias member.

In some embodiments, the method may further include arranging the at least one bias member of the buffer air seal assembly in the first channel formed in the carrier segment, arranging the seal of the buffer air seal assembly in the first channel formed in the carrier segment so that the bias member is located radially between the carrier segment and the seal, and arranging the blade track segment adjacent to the carrier segment so that the seal engages the shroud wall of the blade track segment. In some embodiments, the method may further include discharging a flow of buffer air through the at least one buffer air passageway radially inward away from the carrier segment toward the seal to urge the seal radially inward into engagement with the blade track segment.

In some embodiments, the seal may include a first seal member and a second seal member. In some embodiments, arranging the seal of the buffer air seal assembly in the first channel formed in the carrier segment may include arranging the second seal member in a side groove formed in the first seal member and arranging the first and second seal members in the first channel formed in the carrier segment after arranging the second seal member in the side groove of the first seal member.

In some embodiments, the seal may include an outer seal member, a forward seal member, and an aft seal member. In some embodiments, arranging the seal of the buffer air seal assembly in the first channel formed in the carrier segment may include arranging the outer seal member in the first channel so that the at least one bias member is located radially between the carrier segment and the outer seal member, arranging the forward and aft seal members in the first channel after arranging the outer seal member in the first channel, and spacing the aft seal member apart axially from the forward seal member to define an inner groove therebetween.

In some embodiments, the seal includes a first seal member and a second seal member coupled to the first seal member for movement therewith. The first seal member may have a rectangular cross-sectional shape when viewed in the circumferential direction that defines an inner surface, an outer surface spaced apart radially from the inner surface, and two side surfaces spaced apart axially that extend radially between the inner surface and the outer surface. The second seal member may extend around the inner surface of the first seal member.

In some embodiments, the method may further include providing at least one retainer and inserting the at least one retainer axially into the carrier segment and through the attachment feature of the blade track segment. The method may include inserting the at least one retainer axially into the carrier segment and through the attachment feature of the blade track segment to couple the blade track segment to the carrier segment.

These and other features of the present disclosure will become more apparent from the following description of the illustrative embodiments.

DETAILED DESCRIPTION OF THE DRAWINGS

Figure 1:
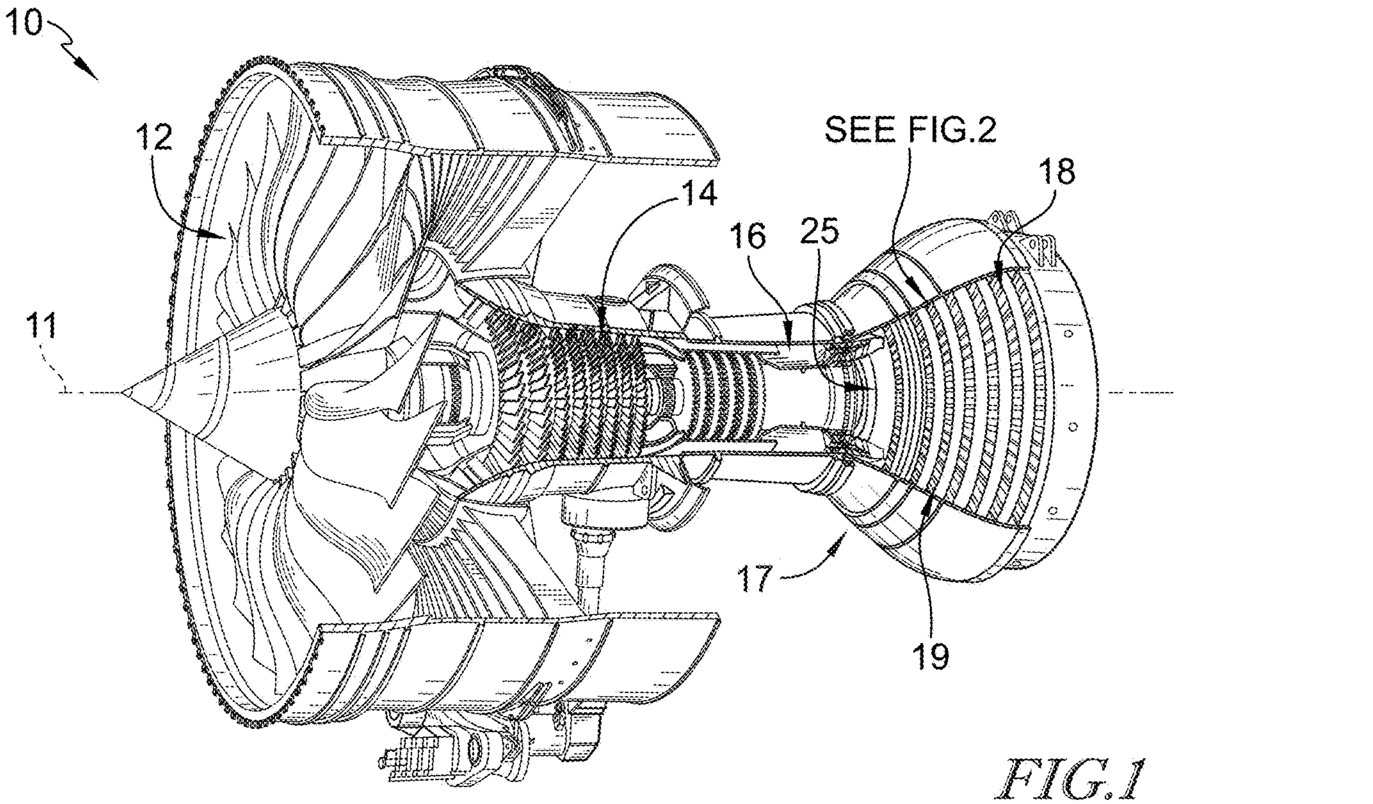
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 is shown in FIGS. 2-6 and is adapted for use in a gas turbine engine 10 as shown in FIG. 1. The turbine shroud segment 22 includes a carrier segment 24 arranged circumferentially at least partway around an axis 11 of the gas turbine engine 10, a blade track segment 26 arranged circumferentially at least partway around the axis 11, a mount system 28 configured to couple the carrier segment 24 to the blade track segment 26, and a seal system 30 as shown in FIGS. 2-6. The seal system 30 is configured to seal gaps between the carrier segment 24 and the blade track segment 26 to prevent or block gases from a gas path 25 of the gas turbine engine 10 from flowing between the carrier segment 24 and the blade track segment 26.

The blade track segment 26 is a ceramic matrix composite component configured to directly face the high temperatures of the gas path 25 of the gas turbine engine 10 to define a portion of the gas path 25. The carrier segment 24 is a metallic support component configured to interface with other metallic components of the gas turbine engine 10, such as the case 17, to support the blade track segment 26 to radially locate the blade track segment 26 relative to the axis 11. The mount system 28 includes at least one retainer 80, 82, and illustratively the mount system 28 includes two retainers 80, 82 that each extend axially into the blade track segment 26 and the carrier segment 24 to couple the blade track segment 26 to the carrier segment 24. The seal system 30 is arranged radially between the carrier segment 24 and the blade track segment 26 to seal a cavity 48 (sometimes referred to as an attachment-receiving space) defined by the carrier segment 24 to block gases from flowing between the carrier segment 24 and the blade track segment 26 and into the cavity 48.

The seal system 30 includes a forward seal assembly 30F and an aft seal assembly 30A as shown in FIGS. 2 and 4-6.

The forward seal assembly 30F is located radially between the carrier segment 24 and the blade track segment 26 on a forward side of the blade track segment 26. The aft seal assembly 30A located radially between the carrier segment 24 and the blade track segment 26 on an aft side of the blade track segment 26. The forward seal assembly 30F includes a seal 31 arranged in a first channel 52 formed in the carrier segment 24. The aft seal assembly 30A includes a plurality of seal members 38A, 38B, 38C arranged in a second channel 58 formed in the carrier segment 24.

Figure 4:
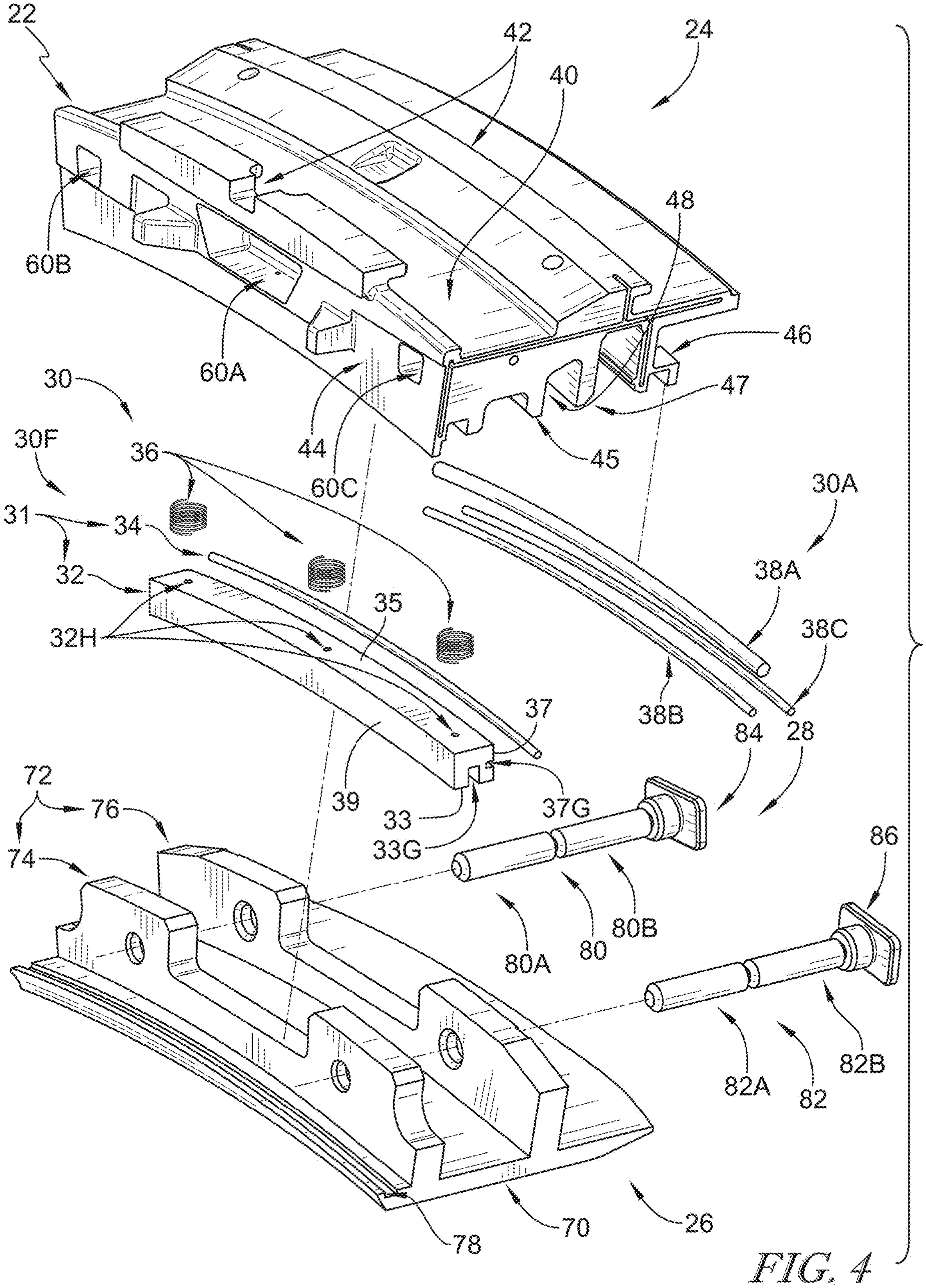
FIG. 4 is an exploded view of the turbine shroud assembly of FIG. 3 showing the seal system includes a forward seal assembly having a seal and bias members configured to be arranged in a first channel formed in the carrier segment and an aft seal assembly having a plurality of seal members configured to be arranged in a second channel formed in the carrier segment.
Figure 5:
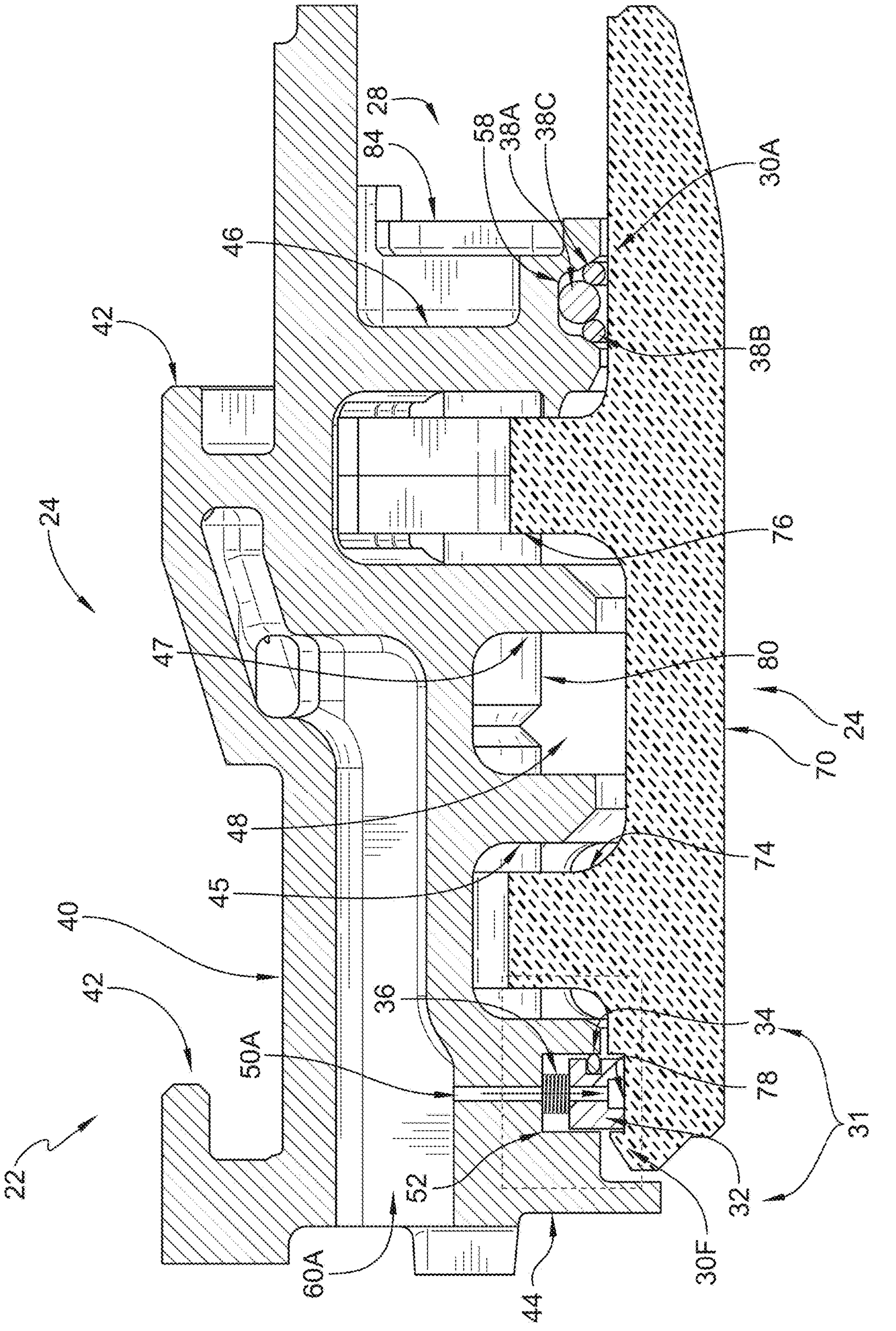
FIG. 5 is a cross-section view of the turbine shroud assembly of FIG. 3 taken along line 5-5 showing the forward support wall of the carrier segment is formed to include the radially-inwardly opening first channel that receives the seal and the bias members of the forward seal assembly and a buffer air passageway configured to discharge buffer air into the first channel to urge the seal radially inward into engagement with the blade track segment, and further showing the shroud wall of the blade track segment is formed to include a radially-outwardly opening second channel that receives the seal.
Figure 6:
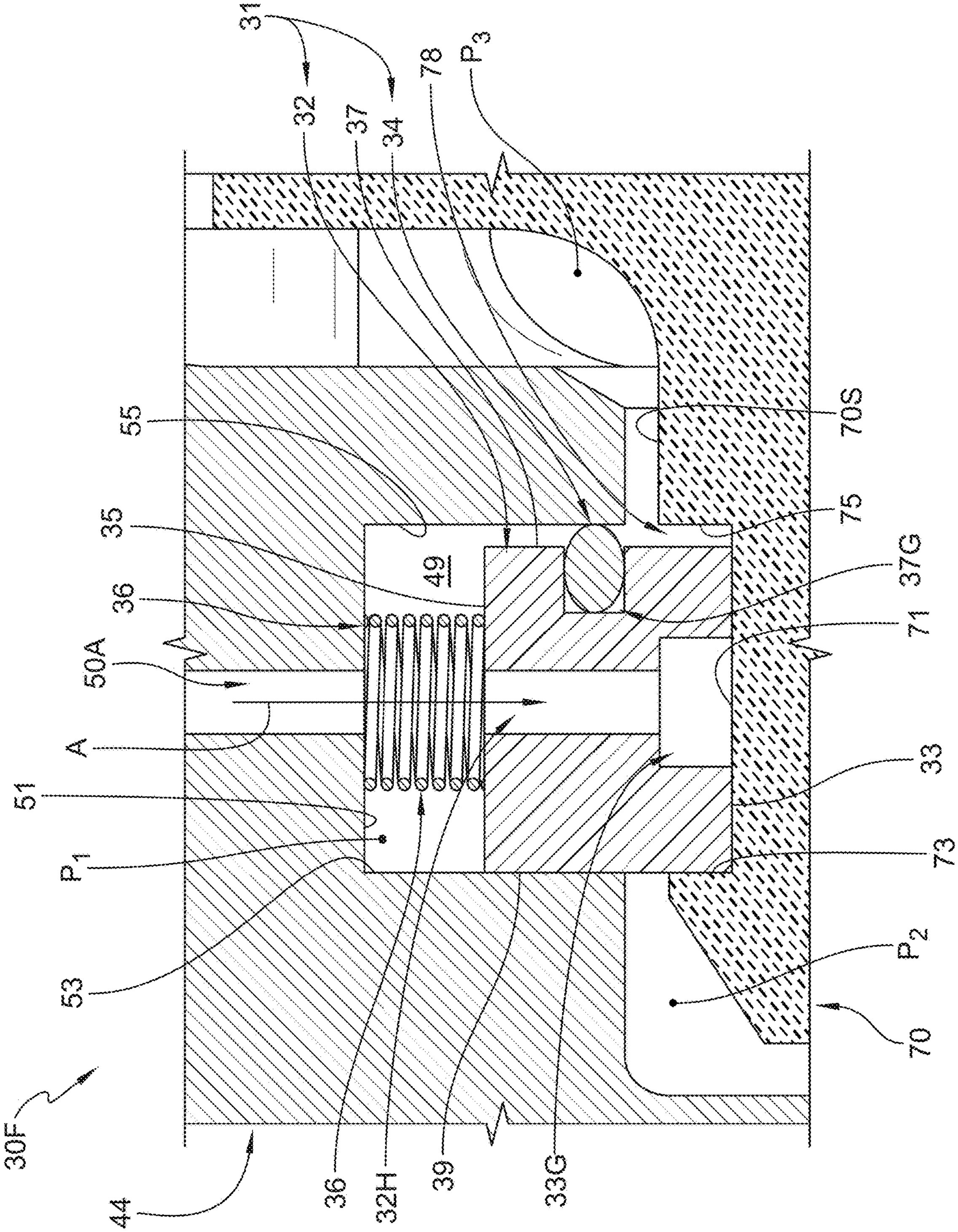
FIG. 6 is a detail view of FIG. 5 showing the forward seal assembly—also referred to as the buffer air seal assembly-includes the seal having a first seal member that extends radially into the first channel formed in the carrier segment and the second channel formed in the blade track segment and a second seal member arranged in a side groove in the first seal member so that the second seal member is axially between the first seal member and the carrier segment.

The forward seal assembly 30F includes the seal 31 that extends circumferentially about the axis 11 and axially across the first channel 52 formed in the carrier segment 24 as shown in FIGS. 4-6. The seal 31 comprises a first seal member 32 and a second seal member 34 that each extend circumferentially about the axis 11 as shown in FIG. 4. Both the first seal member 32 and the second seal member 34 are arranged in the first channel 52 formed in the carrier segment 24. The first seal member 32 extends radially between the carrier segment 24 and the blade track segment 26. The second seal member 34 is arranged in a side groove 37G formed in the first seal member 32 axially between the first seal member 34 and the carrier segment 24 so that the second seal member 34 is engaged with the carrier segment 24. By arranging the second seal member 34, the second seal member 34 is coupled to the first seal member 32 for movement therewith.

During operation of a gas turbine engine 10, the hot, high-pressure products directed into the turbine 18 from the combustor 16 flow across a radially-inwardly opening surface of a shroud wall 70 of the blade track segment 26 that defines a portion of the gas path 25. The seal system 30 blocks the hot, high-pressure products from flowing into the cavity 48 of the turbine shroud segment 22. Some turbine shroud assemblies use seals having at least two seal members, where one of the seals is configured to be compressed between the carrier segment 24 and the blade track segment 26 to bias the other seal member(s) into engagement with the shroud wall 70 of the blade track segment 26, thereby improving the seal therebetween.

In some embodiments, the carrier segment 24 may also include buffer air passageways to direct relatively high-pressure air (sometimes referred to as buffer air) into the channel(s) formed in the carrier segment 24 to distribute the high-pressure air along the seal members. The high-pressure air supplied to the channel(s) is used help keep the gases in the gas path 25 out of the cavity 48 in the event of a seal failure. The high-pressure or buffer air is usually jetted through the seal members arranged in the channel(s), which may cause the seal members to wear, specifically oxidize, significantly reducing the overall life of the seal members and the effectiveness of the seal members.

Instead of using another seal member to urge the other seal member(s) into engagement with the shroud wall 70 of the blade track segment 26, the forward seal assembly 30F—also referred to as the buffer air seal assembly 30F—is pressure-activated. The buffer air is discharged into the first channel 52 formed in the carrier segment 24 as suggested by arrow A in FIG. 6. The buffer air discharged pushes or urges the first seal member 32 of the seal 31 radially inward into engagement with the shroud wall 70 of the blade track segment 26. The pressure activation of the buffer air seal assembly 30F causes the first seal member 32 of the seal 31 to be urged radially inward into engagement with the shroud wall 70 of the blade track segment 26. The seal 31 essentially acts as a piston and is urged radially inward into engagement with the shroud wall 70 of the blade track segment 26 when the buffer air is discharged into the first channel 52.

The second seal member 34 is coupled with the first seal member 32 for movement therewith so that the second seal member 34 is urged radially inward with the first seal member 32. The second seal member 34 is located axially between the carrier segment 24 and the first seal member 32 and engages the carrier segment 24. In the illustrative embodiment, the first seal member 32 and the second seal member 34 of the seal 31 are located in the first channel 52 so that the first seal member 32 engages the carrier segment at the forward side and the second seal member 34 engages the carrier segment at the aft side as shown in FIGS. 5 and 6.

In the illustrative embodiment, the buffer air seal assembly 30F includes the seal 31 and at least one bias member 36 compressed radially between the carrier segment 24 and the seal 31 to apply a bias force to the seal 31 to bias the seal 31 radially inward towards the shroud wall 70 of the blade track segment 26 as shown in FIGS. 4-6. In some embodiments, the buffer air seal assembly 30F may include a plurality of bias members 36 spaced apart circumferentially relative to the axis 11 as shown in FIGS. 4-6.

Each of the bias members 36 is arranged radially between the carrier segment 24 and the first seal member 32 of the seal 31 to bias the seal 31 radially inward into engagement with the shroud wall 70 of the blade track segment 26. The bias member 36 or bias members 36 may be included to assist the pressure activation of the seal 31. The number of bias members 36 may vary based on the pressure activation of the seal 31. In other words, the number of bias members 36 may be increased if additional assistance is needed to help urge the seal 31 into engagement with the blade track segment 26.

In the illustrative embodiment, each of the bias members 36 is a spring. In the illustrative embodiment, each of the bias members 36 is a coil spring. In some embodiments, each of the bias members 36 may be a leaf spring or a wave spring. In some embodiments, each of the bias members 36 may be another suitable spring type. In some embodiments, each of the bias members 36 may be another suitable type of bias member configured to apply a bias force to the seal 31.

The buffer air seal assembly 30F includes the seal 31 and the bias members 36 as shown in FIGS. 4-6. The seal 31 includes a first seal member 32 that extends into a radially-inwardly opening first channel 52 formed in the carrier segment 24 and a second seal member 34 arranged in the groove 37G formed in the first seal member 32 so that the second seal member 34 is axially between the first seal member 32 and the carrier segment 24 as shown in FIGS. 5 and 6. The channel 52 extends circumferentially relative to the axis 11. The bias member 36 is arranged radially between the seal 31 and the carrier segment 24 to urge the seal 31 radially inward into engagement with the blade track segment 26.

The first channel 52 is defined by a first end surface 51, a first—support-wall surface 53, and a second support-wall surface 55 as shown in FIG. 6. The first support-wall surface 53 extends radially inward from the first end surface 51. The second support-wall surface 55 extends radially inward from the first end surface 51 and spaced apart axially from the first—support-wall surface 53. The first seal member 32 may engage the first support-wall surface 53 and the second seal member 34 is engaged with the second support-wall surface 55 as shown in FIG. 6.

In the illustrative embodiment, the first seal member 32 also extends into a radially-outwardly opening third channel 78 formed in the blade track segment 26. The third channel 78 extends circumferentially relative to the axis 11. The third channel 78 is axially aligned with the first channel 52 and extends the same axial length as the first channel 52 as shown in FIG. 6. In some embodiments, the first seal member 32 just engages outer surface 70S of the shroud wall 70 of the blade track segment 26 without any additional channels or grooves formed in the shroud wall 70 the blade track segment 26.

The third channel 78 is defined by a third end surface 71, a first shroud-wall surface 73, and a second shroud-wall surface 75 as shown in FIG. 6. The first shroud-wall surface 73 extends radially outward from the third end surface 71. The second shroud-wall surface 75 extends radially outward from the third end surface 71. The second shroud-wall surface 75 is spaced apart axially from the first shroud-wall surface 73. The first seal member 32 is urged into engagement with the third end surface 71 and may engage the first shroud-wall surface 73 as shown in FIG. 6

The buffer air passageway 50A extends radially into a forward support wall 44 included in the carrier segment 24 and opens into the first channel 52. The buffer air passageway 50A discharges the buffer air into the buffer air cavity 49 defined between the surfaces 51, 53, 55 of the first channel 52 and the first and second seal members 32, 34 as shown in FIGS. 5 and 6. The buffer air discharged pressurizes the buffer air cavity 49 to urge the first seal member 32 radially inward into engagement with in the blade track segment 26.

The second seal member 34 comprises a single strand of solid metallic material. In the illustrative embodiment, the second seal member 34 is a wire seal. In some embodiments, the second seal member 34 may be another suitable seal type. In the illustrative embodiment, the second seal member 34 prevents the buffer air from leaking around the first seal member 32 between the first seal member 32 and the carrier segment 24.

The first seal member 32 has a rectangular cross-sectional shape when viewed in the circumferential direction relative to the axis 11 as shown in FIGS. 5 and 6. In some embodiments, the first seal member 32 may have another suitable seal type.

The rectangular cross-sectional shape of the first seal member 32 defines an inner surface 33, and outer surface 35, and two side surfaces 37, 39 as shown in FIGS. 5 and 6. The inner surface 33 is engaged with the shroud wall 70 of the blade track segment 26. The outer surface 35 is spaced apart radially from the inner surface 33. The side surfaces 37, 39 are spaced apart axially from one another. Each side surface 37, 39 extends radially between the inner surface 33 and the outer surface 35.

The first seal member 32 is formed to include a side groove 37G, an inner groove 33G, and at least one through hole 32H as shown in FIGS. 4-6. The side groove 37G extends axially into the first side surface 37 of the first seal member 32 and circumferentially relative to the axis 11. The inner groove 33G extends radially into the inner surface 33 of the first seal member 32 and circumferentially relative to the axis 11. The second seal member 34 is arranged in the side groove 37G and engages the carrier segment 24 in the first channel 52. The through hole 32H extends radially through the first seal member 32 and opens into the inner groove 33G to allow the buffer air to flow through the first seal member 32 into the inner groove 33G.

In the illustrative embodiment, the first seal member 32 is formed to include a plurality of through holes 32H as shown in FIG. 4. The through holes 32H are spaced apart circumferentially relative to the axis 11. In some embodiments, the number of through holes 32H may be varied to control the amount of buffer air flowing to the inner groove 33G.

Each of the channels 52, 78 also have a rectangular cross-sectional shape when viewed in the circumferential direction relative to the axis 11. The rectangular shape of the channels 52, 78 defines the respective surfaces 51, 51, 53, 55, 71, 73, 75. In the illustrative embodiment, the depth of the first channel is greater than the depth of the third channel as shown in FIGS. 5 and 6. In some embodiments, the depths of the channels may all be equal.

With the seal system 30 of the present disclosure initially described above, the gas turbine engine 10 is now described in more detail. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
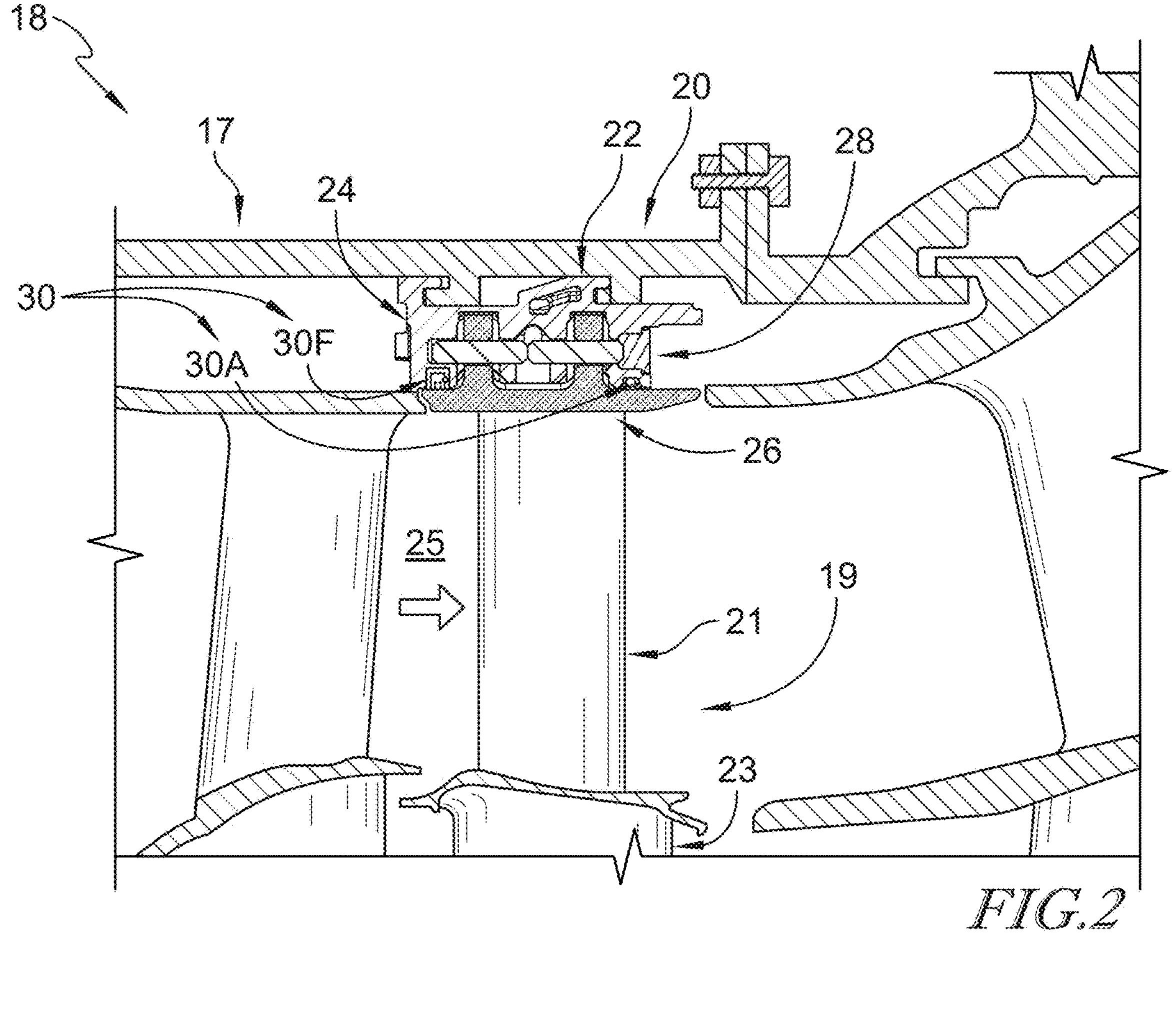
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades, and further showing the turbine shroud assembly includes a carrier segment, a blade track segment coupled to the carrier segment to define a portion of a gas path of the gas turbine engine, and a seal system configured to seal between the carrier segment and the blade track segment to block gases flowing through the gas path from flowing between the carrier segment and the blade track segment.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 21 coupled to a rotor disk 23 for rotation with the disk 23. The hot, high pressure combustion products from the combustor 16 are directed toward the blades 21 of the turbine wheel assemblies 19 along the gas path 25. The turbine shroud 20 is coupled to the outer case 17 of the gas turbine engine 10 and extends around the turbine wheel assembly 19 to block gases from passing over the turbine blades 21 during use of the turbine 18 in the gas turbine engine 10.

In the illustrative embodiment, the turbine shroud 20 is made up of a number of turbine shroud segment assemblies 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine shroud segment 22 includes the carrier segment 24, blade track segment, the mount system 28, and the seal system 30 as shown in FIGS. 2-6. The carrier segment 24 and the blade track segment 26 are arranged circumferentially partway about the axis 11. The blade track segment 26 includes the shroud wall 70 that extends circumferentially partway around the axis 11 to define a portion of the gas path 25 and an attachment feature 72 that extends radially from the shroud wall 70 into the cavity 48 of the carrier segment 24. The mount system 28 is configured to couple the blade track segment 26 to the carrier segment 24. The seal system 30 is arranged radially between the carrier segment 24 and the blade track segment 26 to seal gaps therebetween.

The carrier segment 24 includes an outer wall 40, a pair of hangers 42, a forward support wall 44, and an aft support wall 46 as shown in FIGS. 3-6. The outer wall 40 extends circumferentially at least partway about the axis 11. The hangers 42 extend radially outward from the outer wall 40 and engage the case 17 to couple the turbine shroud segment 22 to the rest of the engine 10. The forward support wall 44 extends radially inward from the outer wall 40 at a forward end of the outer wall 40 axially forward of the attachment feature 72 and the aft support wall 46 extends radially inward from the outer wall 40 at an aft end of the outer wall 40 axially aft of the attachment feature 72.

Figure 3:
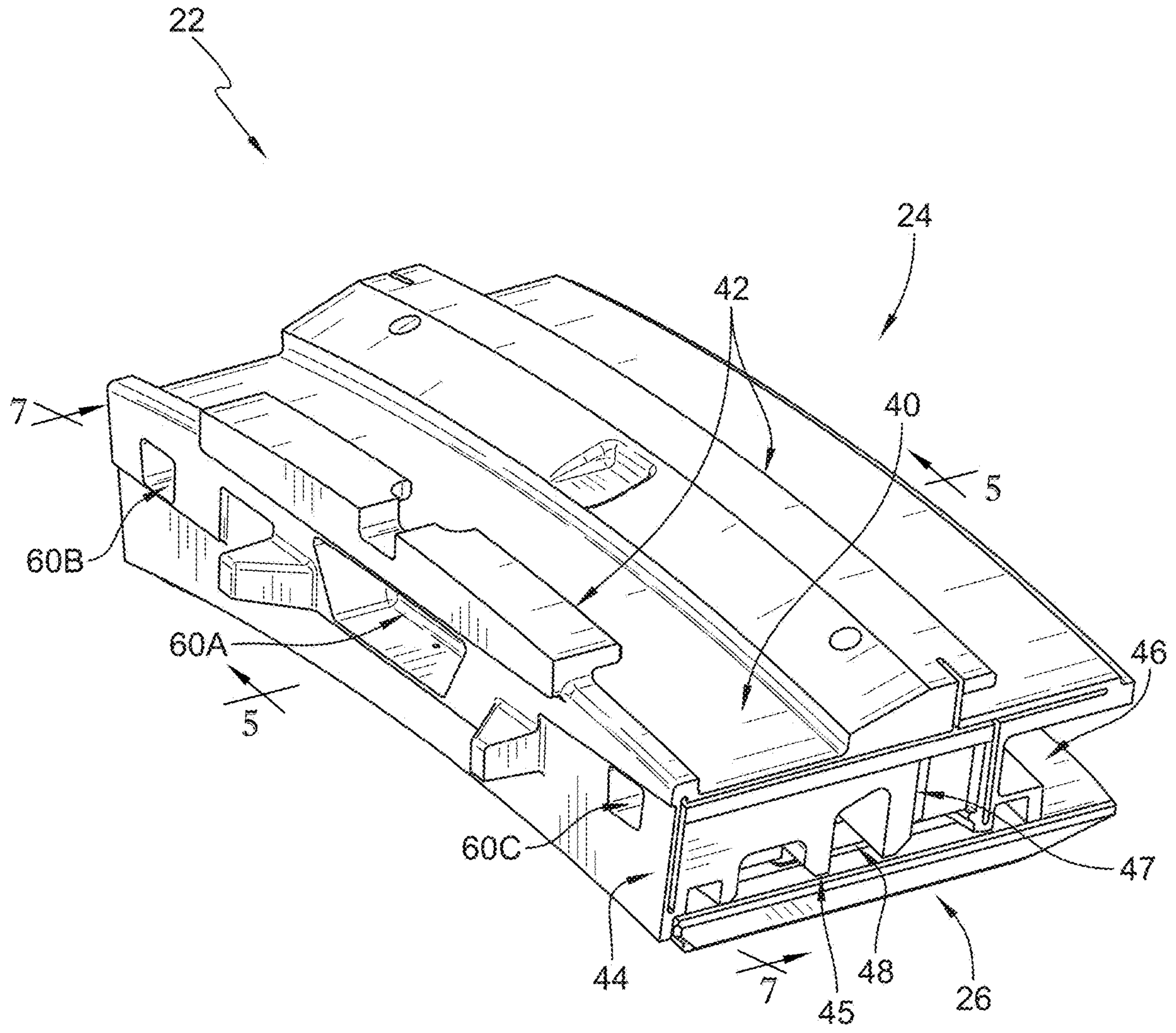
FIG. 3 is a perspective view of a portion of the turbine shroud assembly of FIG. 2 showing the turbine shroud assembly includes the carrier segment and the blade track segment made from ceramic matrix composite materials coupled to the carrier segment.

In the illustrative embodiment, the carrier segment 24 further includes a first intermediate support wall 45 and a second intermediate support wall 47 as shown in FIGS. 3, 4, and 6. The first intermediate support wall 45 and the second intermediate support wall 47 each extend radially inward from the outer wall 40 of the carrier segment 24 axially between the first and second support walls 44, 46. The second intermediate support wall 47 is spaced apart axially from the first intermediate support wall 45 in the illustrative embodiment.

The forward and aft support walls 44, 46 of the carrier segment 24 each include corresponding channels 52, 58 as shown in FIGS. 5 and 6. The forward support wall 44 is formed to include the first channel 52. The aft support wall 46 is formed to include a second channel 58 in the illustrative embodiment. Both the first channel 52 and the second channel 58 are radially-inwardly opening so that the channels 52, 58 are open towards the blade track segment 26.

In the illustrative embodiment, only the forward support wall 44 includes the buffer air passageway 50A as shown in FIGS. 5 and 6. The forward support wall 44 includes at least one discrete buffer air passageway 50A that extends radially into the forward support wall 44 and opens into the first channel 52. In the illustrative embodiment, the forward support wall 44 includes a plurality of buffer air passageways 50A that are spaced apart circumferentially about the axis 11.

Figure 7:
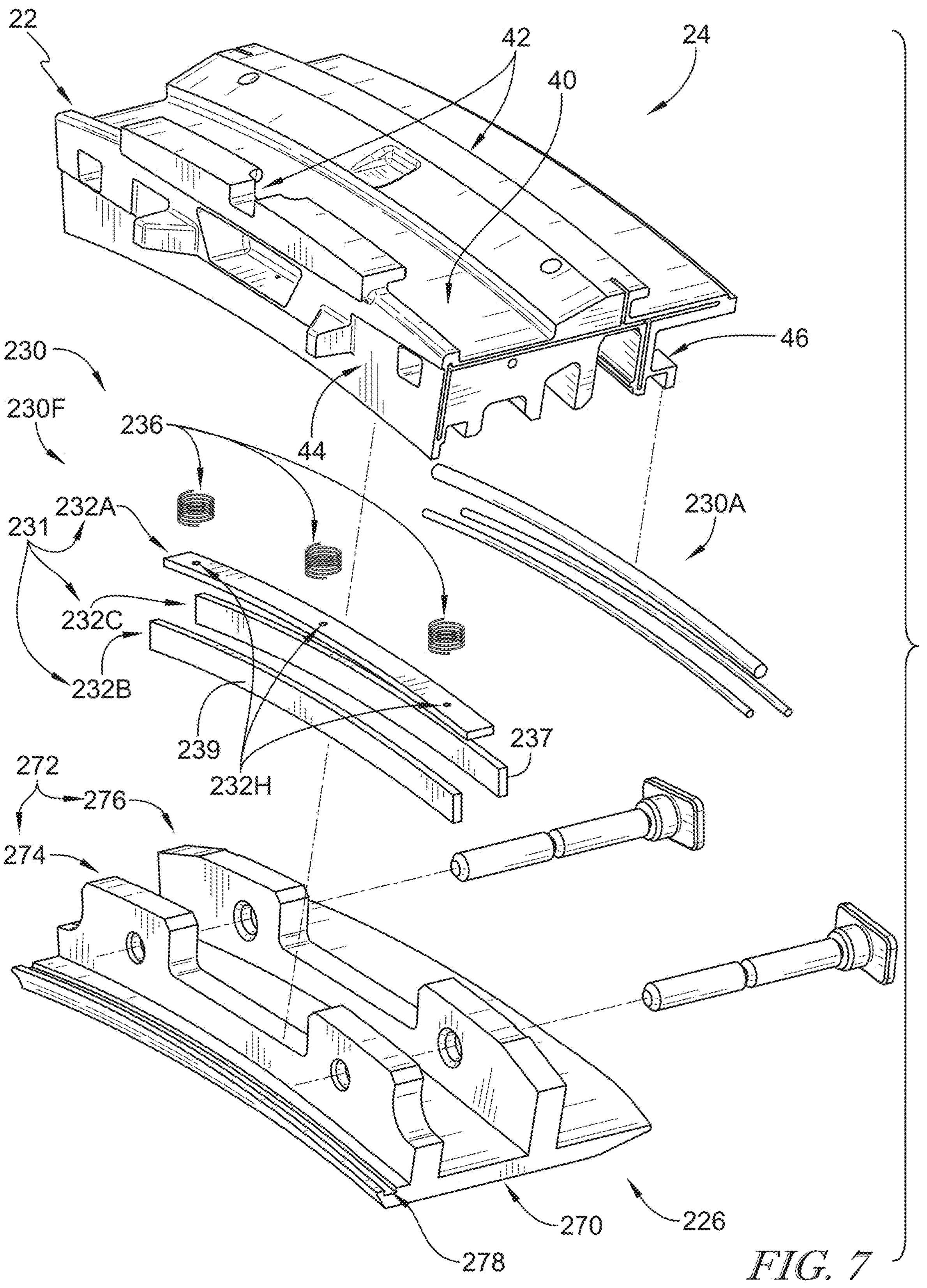
FIG. 7 is an exploded view of another turbine shroud assembly included in the gas turbine engine of FIG. 1 showing the turbine shroud assembly includes a carrier segment, a blade track segment, and a seal system having a forward seal assembly configured to be arranged in a first channel formed in the carrier segment and an aft seal assembly configured to be arranged in a second channel formed in the carrier segment, and further showing the forward seal assembly includes a seal made up of a plurality seal members configured to be assembled together in the first channel.

In the illustrative embodiment, each buffer air passageway 50A extends from an outer cavity 60A, 60B, 60C formed in the outer wall 40 of the carrier segment 24 as shown in FIGS. 5 and 7. The buffer air flows from the outer cavity 60A, 60B, 60C to the buffer air passageways 50A. In some embodiments, the carrier segment 24 is formed to include an outer cavity 60A, 60B, 60C for each buffer air passageway 50A that supplies the corresponding buffer air passageway 50A with buffer air.

The first channel 52 formed in the forward support wall 44 is defined by the first end surface 51, the first support-wall surface 53, and a second support-wall surface 55 as shown in FIG. 6. The first support-wall surface 53 extends radially inward from the first end surface 51. The second support-wall surface 55 extends radially inward from the first end surface 51. The second support-wall surface 55 is spaced apart axially from the first support-wall surface 53.

The blade track segment 26 includes the shroud wall 70 and the attachment feature 72 as shown in FIGS. 4-6. The shroud wall 70 that extends circumferentially partway around the axis 11. The attachment feature 72 includes a first attachment flange 74 and a second attachment flange 76 that each extend radially outward from the shroud wall 70. The second attachment flange 76 is spaced apart axially from the first attachment flange 74.

In the illustrative embodiment, the forward support wall 44 extends radially inward from the outer wall 40 axially forward of the first attachment flange 74 of the blade track segment 26. The aft support wall 46 extends radially inward from the outer wall 40 axially aft of the second attachment flange 76 of the blade track segment 26. The first intermediate support wall 45 extends radially inward from the outer wall 40 axially aft of the first attachment flange 74 so that the first attachment flange 74 is axially between the forward support wall 44 and the first intermediate support wall 45. The second intermediate support wall 47 extends radially inward from the outer wall 40 axially forward of the second attachment flange 76 of the blade track segment 26 so that the second attachment flange 76 is located axially between the aft support wall 46 and the second intermediate support wall 47.

In the illustrative embodiment, the shroud wall 70 of the blade track segment 26 is formed to include the third channel 78 as shown in FIGS. 4-6. The third channel 78 is defined by a third end surface 71, a first shroud-wall surface 73, and a second shroud-wall surface 75 as shown in FIG. 6. The first shroud-wall surface 73 extends radially outward from the third end surface 71. The second shroud-wall surface 75 extends radially outward from the third end surface 71. The second shroud-wall surface 75 is spaced apart axially from the first shroud-wall surface 73.

In some embodiments, the shroud wall 70 of the blade track segment 26 may have a coating layer applied in the third channel 78. The coating layer in the third channel 78 may define the third end surface 71, the first shroud-wall surface 73, and the second shroud-wall surface 75. The first seal member 32 may engage the coating layer in the third channel 78.

The mount system 28 includes at least one retainer 80, 82, illustratively two retainers 80, 82 that each extend axially into the blade track segment 26 and the carrier segment 24 to couple the blade track segment 26 to the carrier segment 24. The retainers 80, 82 extend axially into the forward support wall 44, through the first attachment flange 74, the intermediate support walls 43, 45, and the second attachment flange 76, and into the aft support wall 46 of the carrier segment 24 so as to couple the blade track segment 26 to the carrier segment 24.

In the illustrative embodiment, the mount system 28 includes the retainers 80, 82 and corresponding retainer plugs 84, 86 as shown in FIG. 4. Each of the retainer plugs 84 extends into an installation apertures formed in the aft support wall 46 to block removal of the corresponding retainers 80, 82 through the installation apertures in the carrier segment 24.

In the illustrative embodiment, the retainers 80, 82 are both split pins as shown in FIG. 3. Each retainer 80, 82 includes a first pin 80A, 82A and a second pin 80B, 82B arranged axially aft of the first pin 80A, 82A as shown in FIG. 4.

A method of assembling and using the turbine shroud segment 22 may include several steps. The method includes arranging the seal members 32, 34 of the forward seal assembly 30F and the seal members 38A, 38B, 38C of the aft seal assembly 30A in the corresponding channels 52, 58 before arranging the blade track segment 26 adjacent to the carrier segment 24. The method includes arranging the seal 31 in the first channel 52 and arranging the other seal members 38A, 38B, 38C in the second channel 58. The seal assemblies 30F, 30A may be arranged in the corresponding channels 52, 58, in any order.

The step of arranging the seal 31 in the first channel 52 may include arranging the second seal member 34 in the side groove 37G formed in the first seal member 32 and then arranging the assembled first and second seal members 32, 34 in the first channel 52 formed in the carrier segment 24 after arranging the second seal member 34 in the side groove 37G of the first seal member 32. In illustrative embodiment, the method includes arranging at least one bias member 36 in the first channel 52 before arranging the seal 31 in the first channel 52.

Once all the seal members 32, 34, 38A, 38B, 38C are arranged in the corresponding channels 52, 58, the blade track segment 26 is arranged adjacent to the carrier segment 24 so that the seal 31 of the forward seal assembly 30F and the seal members 38A, 38B, 38C of the aft seal assembly 30A are radially between the carrier segment 24 and the shroud wall 70 of the blade track segment 26 to block gases in the gas path from flowing between the carrier segment 24 and the blade track segment 26. The blade track segment 26 is arranged adjacent to the carrier segment 24 so that the first attachment flange 74 and the second attachment flange 76 of the attachment feature 72 extend into sections of the cavity 48. In the illustrative embodiment, the blade track segment 26 is arranged adjacent to the carrier segment 24 so that the first seal member 32 of the seal 31 also extends into the third channel 78 formed in the shroud wall 70 of the blade track segment 26.

In some embodiments, the method further includes inserting the retainers 80, 82 into the carrier segment 24 and the blade track segment 26 to couple the blade track segment 26 to the carrier segment 24. The method includes inserting one retainer 80 axially into the carrier segment 24 and through the attachment feature 72 of the blade track segment 26 to couple the blade track segment 26 to the carrier segment 24. The method further includes inserting another retainer 82 axially into the carrier segment 24 and through the attachment feature 72 of the blade track segment 26 to couple the blade track segment 26 to the carrier segment 24. The second retainer 82 is inserted at a location spaced apart circumferentially from the first retainer 80.

The method further includes discharging a flow of buffer air through the at least one buffer air passageway 50A. The flow of buffer air is suggested by arrow A. The method may further include discharging the flow of buffer air through the plurality of buffer air passageways 50A. The method includes discharging the flow of buffer air through the buffer air passageway 50A radially inward away from the carrier segment 24 into the buffer air cavity 49 defined between the seal 31 and the first channel 52 formed in the carrier segment 24. The buffer air is discharged into the buffer air cavity 49 to urge the seal 31 radially inward into engagement with the blade track segment 26.

The buffer air discharged into the buffer air cavity 49 and into the inner groove 33G establishes a higher pressure $P_1$ in the buffer air cavity 49 than the pressure $P_2$ in the region axially forward of the buffer air seal assembly 30F and the pressure $P_3$ in the cavity 48 as shown in FIG. 6. The pressure $P_3$ in the cavity 48 is lower than the pressure $P_2$ in the region axially forward of the buffer air seal assembly 30F radially outward of the gas path 25 as shown in FIG. 6. The buffer air may be provided from the compressor 14 of the gas turbine engine 10.

The through holes 32H in the first seal member 32 allow a portion of the buffer air to flow through the first seal member 32 into the inner groove 33G. The buffer air flowing into the buffer air cavity 49 may leak around the sides of the seal 31 in the illustrative embodiment. The buffer air flowing into the inner groove 33G may leak around the end of the first seal member 32 as the pressure $P_3$ in the cavity 48 and the pressure $P_2$ in the region axially forward of the buffer air seal assembly 30F are at a lower pressure.

Figure 8:
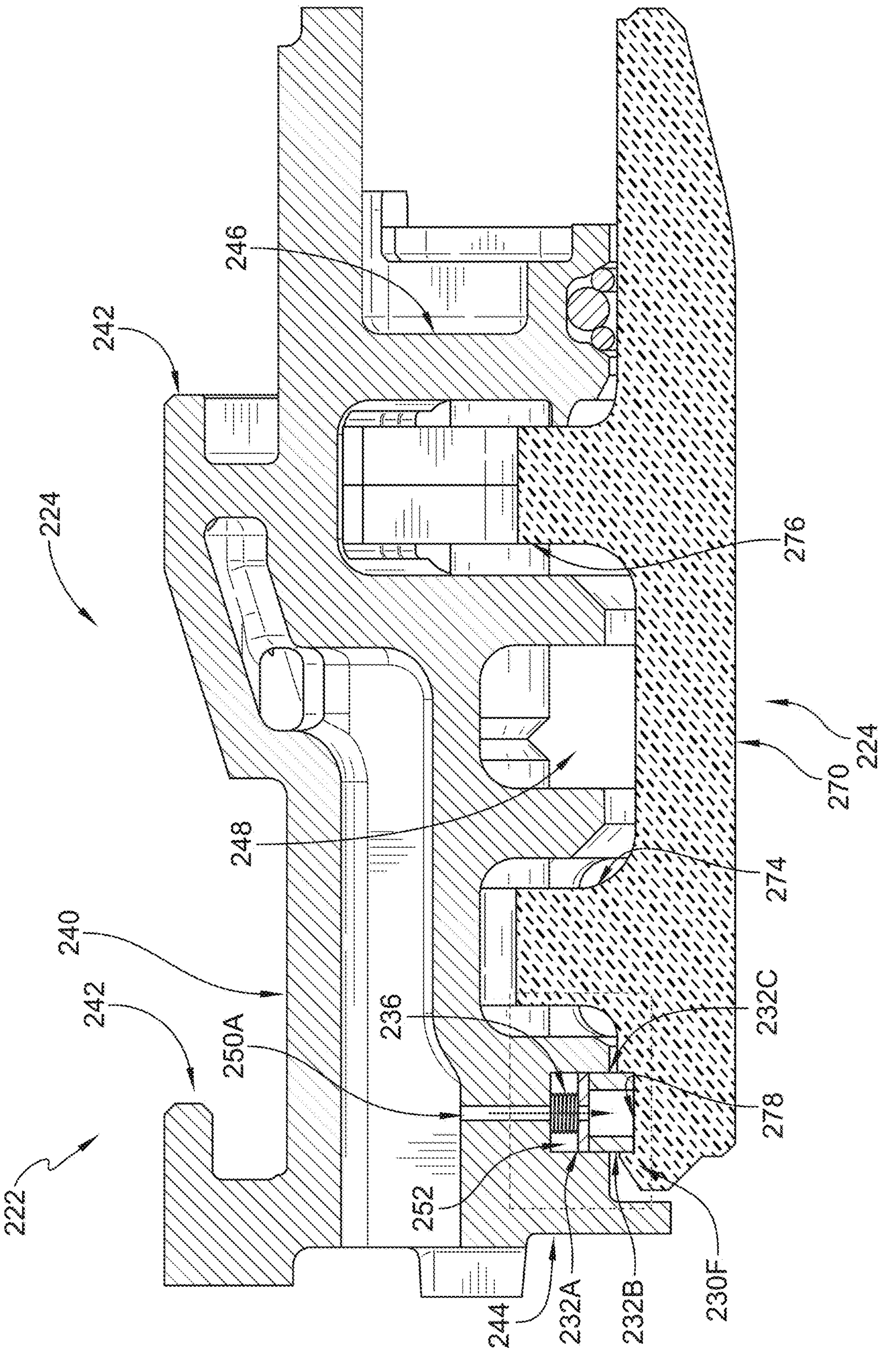
FIG. 8 is a cross-sectional view of the turbine shroud assembly of FIG. 7 showing the forward support wall of the carrier segment is formed to include the radially-inwardly opening first channel that receives the seal of the forward seal assembly and a buffer air passageway configured to discharge buffer air into the first channel to urge the seal radially inward into engagement with the blade track segment.
Figure 9:
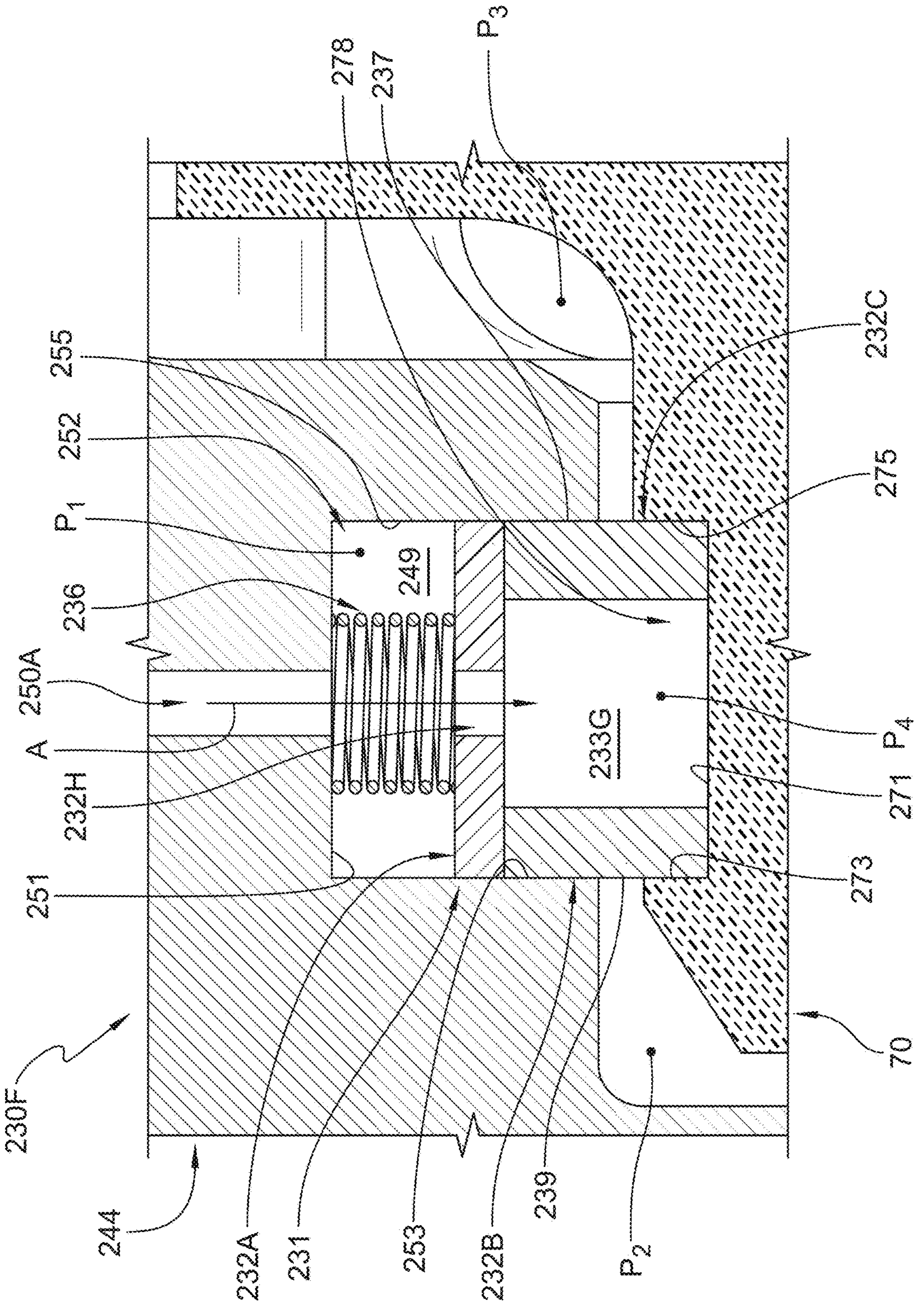
FIG. 9 is a detail view of FIG. 8 showing the forward seal assembly—also referred to as the buffer air seal assembly-includes the seal having an outer seal member, a forward seal member that extends radially inward from the outer seal member, and an aft seal member that extends radially inward from the outer seal member and spaced apart axially from the forward seal member to define a buffer air cavity therebetween, and further showing the outer seal member is formed to include at least one through hole that extends radially through the outer seal member to allow the buffer air to flow through the outer seal member into the buffer air cavity to urge the forward seal member axially forward and the aft seal member axially aft into engagement with the carrier segment.

Another embodiment of a turbine shroud segment 222 in accordance with the present disclosure is shown in FIGS. 7-9. The turbine shroud segment 222 is substantially similar to the turbine shroud segment 22 shown in FIGS. 1-7 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 22.

The turbine shroud segment 222 includes a carrier segment 224 arranged circumferentially at least partway around an axis 11 of the gas turbine engine 10, a blade track segment 226 arranged circumferentially at least partway around the axis 11, and a seal system 230 as shown in FIGS. 7-9. The seal system 230 is configured to seal gaps between the carrier segment 224 and the blade track segment 226 to prevent or block gases from the gas path 25 of the gas turbine engine 10 from flowing between the carrier segment 224 and the blade track segment 226.

The seal system 230 includes forward seal assembly 230F located radially between the carrier segment 224 and the blade track segment 226 on a forward side of the blade track segment 226 and an aft seal assembly 230A located radially between the carrier segment 224 and the blade track segment 226 on an aft side of the blade track segment 226. The forward seal assembly 230F—also referred to as the buffer air seal assembly 230F—includes a seal 231 having a plurality of seal members 232A, 232B, 232C and bias members 236.

The seal 231 includes an outer seal member 232A, a forward seal member 232B, and an aft seal member 232C as shown in FIGS. 7-9. Each of the seal members 232A, 232B, 232C extend circumferentially relative to the axis 11. The outer seal member 232A, the forward seal member 232B, and aft seal member 232C are free to move relative to each other. When arranged in the first channel 52, the forward seal member 232B and the aft seal member 232C each extend radially inward from the outer seal member 232A. The aft seal member 232C is spaced apart axially from the forward seal member 232B to define an inner groove 233G therebetween.

The outer seal member 232A is formed to include at least one through hole 232H as shown in FIGS. 7-9. The through hole 232H extends radially through the outer seal member 232A and opens into the inner groove 233G to allow the buffer air to flow through the outer seal member 232A into the inner groove 233G to urge the forward seal member 232B axially forward and the aft seal member 232C axially aft into engagement with the carrier segment 224 and the blade track segment 226. In the illustrative embodiment, the outer seal member 232A is formed to include a plurality of through holes 232H as shown in FIGS. 7 and 9. The through holes 232H are spaced apart circumferentially relative to the axis 11.

In the illustrative embodiment, the buffer air seal assembly 230F includes the seal 231 and at least one bias member 236 compressed radially between the carrier segment 224 and the seal 231 to apply a bias force to the seal 231 to bias the seal 231 radially inward towards the shroud wall 270 of the blade track segment 226 as shown in FIGS. 7-9. In some embodiments, the buffer air seal assembly 230F may include a plurality of bias members 236 spaced apart circumferentially relative to the axis 11 as shown in FIGS. 7-9.

Each of the bias members 236 is arranged radially between the carrier segment 224 and the outer seal member 232A of the seal 231 to bias the forward and aft seal members 232B, 232C of the seal 231 radially inward into engagement with the shroud wall 270 of the blade track segment 226. The bias member 236 or bias members 236 may be included to assist the pressure activation of the seal 231. The forward and aft seal members 232B, 232C are radially inward of the outer seal member 232A so that the bias members 236 urge the outer seal member 232A radially inward to cause the forward and aft seal members 232B, 232C to also be urged radially inward into engagement with the blade track segment 226.

The first channel 252 is defined by a first end surface 251, a first—support-wall surface 253, and a second support-wall surface 255 as shown in FIG. 9. The first support-wall surface 253 extends radially inward from the first end surface 251. The second support-wall surface 255 extends radially inward from the first end surface 251 and spaced apart axially from the first support-wall surface 253. The forward seal member 232B engages the first support-wall surface 53 and the aft seal member 232C engages the second support-wall surface 55 as shown in FIG. 9.

In the illustrative embodiment, the forward and aft seal members 232B, 232C also extend into a radially-outwardly opening third channel 278 formed in the blade track segment 226. The third channel 278 extends circumferentially relative to the axis 11. The third channel 278 is axially aligned with the first channel 252 and extends the same axial length as the first channel 252.

The third channel 278 is defined by a third end surface 271, a first shroud-wall surface 273, and a second shroud-wall surface 275 as shown in FIG. 9. The first shroud-wall surface 273 extends radially outward from the third end surface 271. The second shroud-wall surface 275 extends radially outward from the third end surface 271. The second shroud-wall surface 275 is spaced apart axially from the first shroud-wall surface 273.

The forward and aft seal members 232B, 232C are both urged into engagement with the third end surface 71 as shown in FIG. 9. The forward seal member 232B engages the first shroud-wall surface 273 and the aft seal member 232C engages the second shroud-wall surface 275.

The buffer air passageway 250A extends radially into the forward support wall 244 included in the carrier segment 224 and opens into the first channel 252. The buffer air passageway 250A discharges the buffer air into the buffer air cavity 249 defined between the surfaces 251, 253, 255 of the first channel 252 and the outer seal member 232A as shown in FIGS. 8 and 9. The buffer air discharged pressurizes the buffer air cavity 249 to urge the seal 231 radially inward into engagement with the blade track segment 226.

Each of the seal members 232A, 232B, 232C have a rectangular cross-sectional shape when viewed in the circumferential direction relative to the axis 11 as shown in FIGS. 7-9. In some embodiments, the seal members 232A, 232B, 232C may have another suitable seal type.

The rectangular cross-sectional shape of the seal members 232A, 232B, 232C defines the surfaces that engage the carrier segment 224 and/or the blade track segment 226. Each side surface 237, 239 of the respective seal member 232B, 232C engages the respective surfaces of the carrier segment 224 and the blade track segment 226.

The carrier segment 224 includes an outer wall 240, a pair of hangers 242, a forward support wall 244, and an aft support wall 246 as shown in FIGS. 7-9. The outer wall 240 extends circumferentially at least partway about the axis 11. The forward support wall 244 extends radially inward from the outer wall 240 at a forward end of the outer wall 240 axially forward of the attachment flange 274 and the aft support wall 246 extends radially inward from the outer wall 240 at an aft end of the outer wall 240 axially aft of the attachment flange 276.

The forward support wall 244 of the carrier segment 224 includes the first channel 252 as shown in FIGS. 8 and 9. The forward support wall 244 is formed to include the first channel 252. The first channel 252 is radially-inwardly opening so that the channel 252 is open toward the blade track segment 226. In the illustrative embodiment, only the forward support wall 244 includes the buffer air passageway 250A as shown in FIGS. 8 and 9.

The blade track segment 226 includes the shroud wall 270 and the attachment flanges 274, 276 as shown in FIGS. 7-9. The shroud wall 270 that extends circumferentially partway around the axis 11. The first attachment flange 274 and the second attachment flange 276 each extend radially outward from the shroud wall 270. The second attachment flange 276 is spaced apart axially from the first attachment flange 274.

In the illustrative embodiment, the shroud wall 270 of the blade track segment 226 is formed to include the third channel 278 as shown in FIGS. 7-9. The third channel 278 is defined by a third end surface 271, a first shroud-wall surface 273, and a second shroud-wall surface 275 as shown in FIG. 9. The first shroud-wall surface 273 extends radially outward from the third end surface 271. The second shroud-wall surface 275 extends radially outward from the third end surface 271. The second shroud-wall surface 275 is spaced apart axially from the first shroud-wall surface 273.

A method of assembling and using the turbine shroud segment 222 may include several steps. The method includes arranging the seal members 232A, 232B, 232C of the seal 231 of the forward seal assembly 230F in the first channel 252 before arranging the blade track segment 226 adjacent to the carrier segment 224. In the illustrative embodiment, the method includes arranging the bias member 236 or bias members 236 in the first channel 252 before arranging the seal 231 in the first channel 252.

The step of arranging the seal 231 in the first channel 252 may include arranging the outer seal member 232A in the first channel 252 so that the bias member 236 is located radially between the carrier segment 224 and the outer seal member 232A. Then the forward and aft seal members 232B, 232C may be arranged in the first channel 252 after arranging the outer seal member 232A in the first channel, 252. The ends of the seal members 232B, 232C may be engages with the outer seal member 232A when arranging the forward and aft seal members 232B, 232C in the first channel 252. Additionally, the method arranging step further includes spacing the aft seal member 232C apart axially from the forward seal member 232B to define the inner groove 233G therebetween.

Once all the seal members 232A, 232B, 232C are arranged in the first channel 252, the blade track segment 226 is arranged adjacent to the carrier segment 224 so that the seal 231 of the forward seal assembly 230F is radially between the carrier segment 224 and the shroud wall 270 of the blade track segment 226 to block gases in the gas path from flowing between the carrier segment 224 and the blade track segment 226. In the illustrative embodiment, the blade track segment 226 is arranged adjacent to the carrier segment 224 so that the forward and aft seal members 232B, 232C of the seal 231 also extend into the third channel 278 formed in the shroud wall 270 of the blade track segment 226.

The method further includes discharging a flow of buffer air through the at least one buffer air passageway 250A. The flow of buffer air is suggested by arrow A. The method may further include discharging the flow of buffer air through the plurality of buffer air passageways 250A. The method includes discharging the flow of buffer air through the buffer air passageway 250A radially inward away from the carrier segment 224 into the buffer air cavity 249 defined between the seal 231 and the first channel 252 formed in the carrier segment 224. The buffer air is discharged into the buffer air cavity 249 to urge the seal 231 radially inward into engagement with the blade track segment 226.

The through holes 232H in the first seal member 232 allow a portion of the buffer air to flow through the first seal member 232 into the inner groove 233G. The buffer air may pressurize the buffer air cavity 249 to establish a pressure $P_4$ in the inner groove 233G that is greater than the pressure $P_2$ in the region axially forward of the buffer air seal assembly 230F and the pressure $P_3$ in the region axially aft of the buffer air seal assembly 230F.

The buffer air discharged into the buffer air cavity 249 and into the inner groove 233G establishes a higher pressure $P_1$ in the buffer air cavity 249 than the pressure $P_2$ in the region axially forward of the buffer air seal assembly 230F and the pressure $P_3$ in the cavity 248 as shown in FIG. 9. The pressure $P_3$ in the cavity 248 is lower than the pressure $P_2$ in the region axially forward of the buffer air seal assembly 230F as shown in FIG. 9. The buffer air may be provided from the compressor 14 of the gas turbine engine 10.

The through holes 232H in the outer seal member 232A allow a portion of the buffer air to flow through the first seal member 232 into the inner groove 233G. The pressure $P_4$ in the inner groove 233G is greater than the pressure $P_3$ in the cavity 48 and the pressure $P_2$ in the region axially forward of the buffer air seal assembly 30F, which may urge the forward seal member 232B axially forward into engagement with the surfaces 253, 273 and may urge the aft seal member 232C axially aft into engagement with the surfaces 255, 275. The buffer air flowing into the inner groove 233G may leak around the ends of the seal members 232B, 232C as the pressure $P_3$ in the cavity 48 and the pressure $P_2$ in the region axially forward of the buffer air seal assembly 30F are at a lower pressure.

Figure 10:
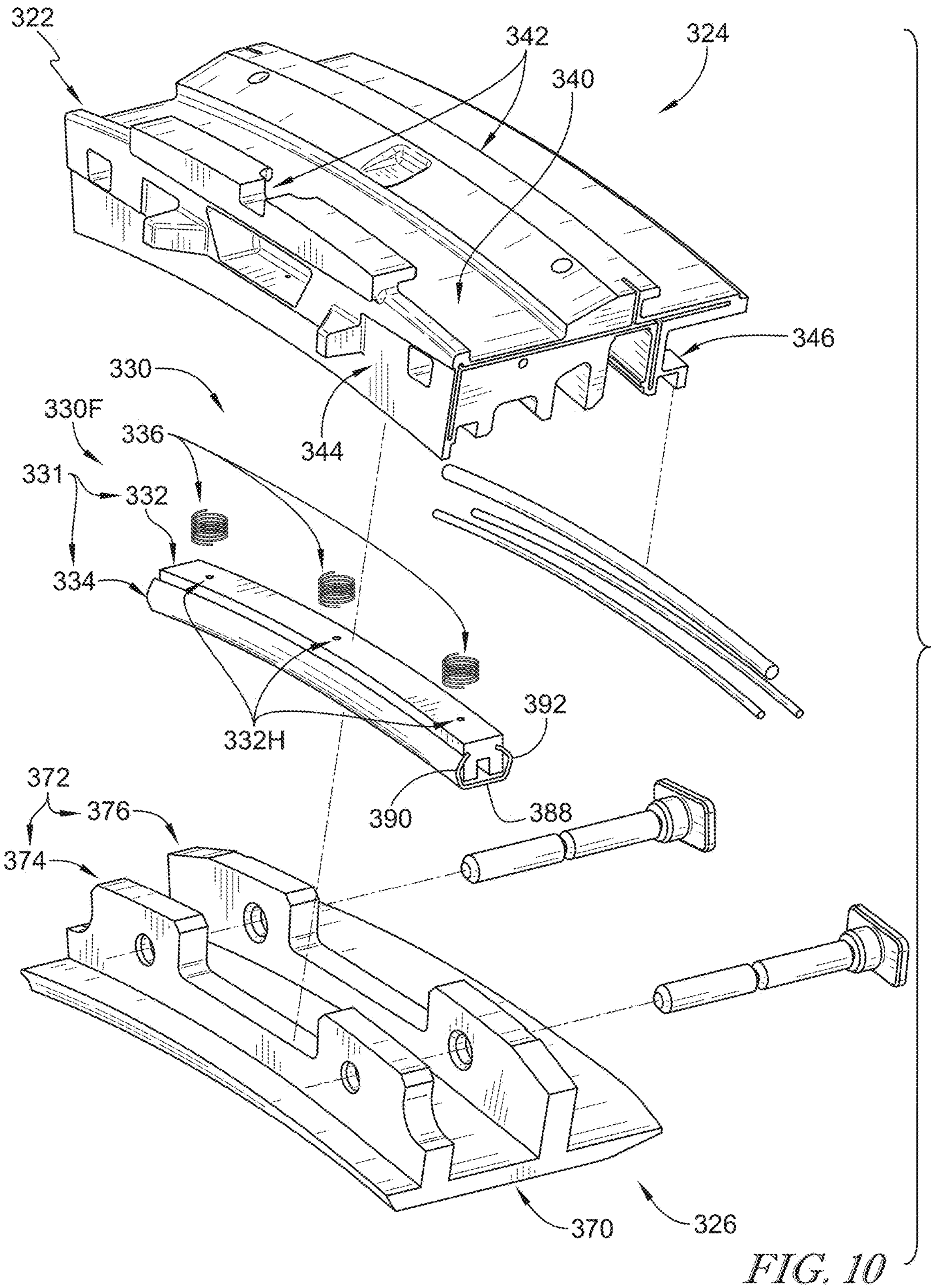
FIG. 10 is an exploded view of another turbine shroud assembly included in the gas turbine engine of FIG. 1 showing the turbine shroud assembly includes a carrier segment, a blade track segment, and a seal system having a forward seal assembly configured to be arranged in a first channel formed in the carrier segment and an aft seal assembly configured to be arranged in a second channel formed in the carrier segment, and further showing the forward seal assembly includes a seal made up two seal members configured to assembled together in the first channel.
Figure 11:
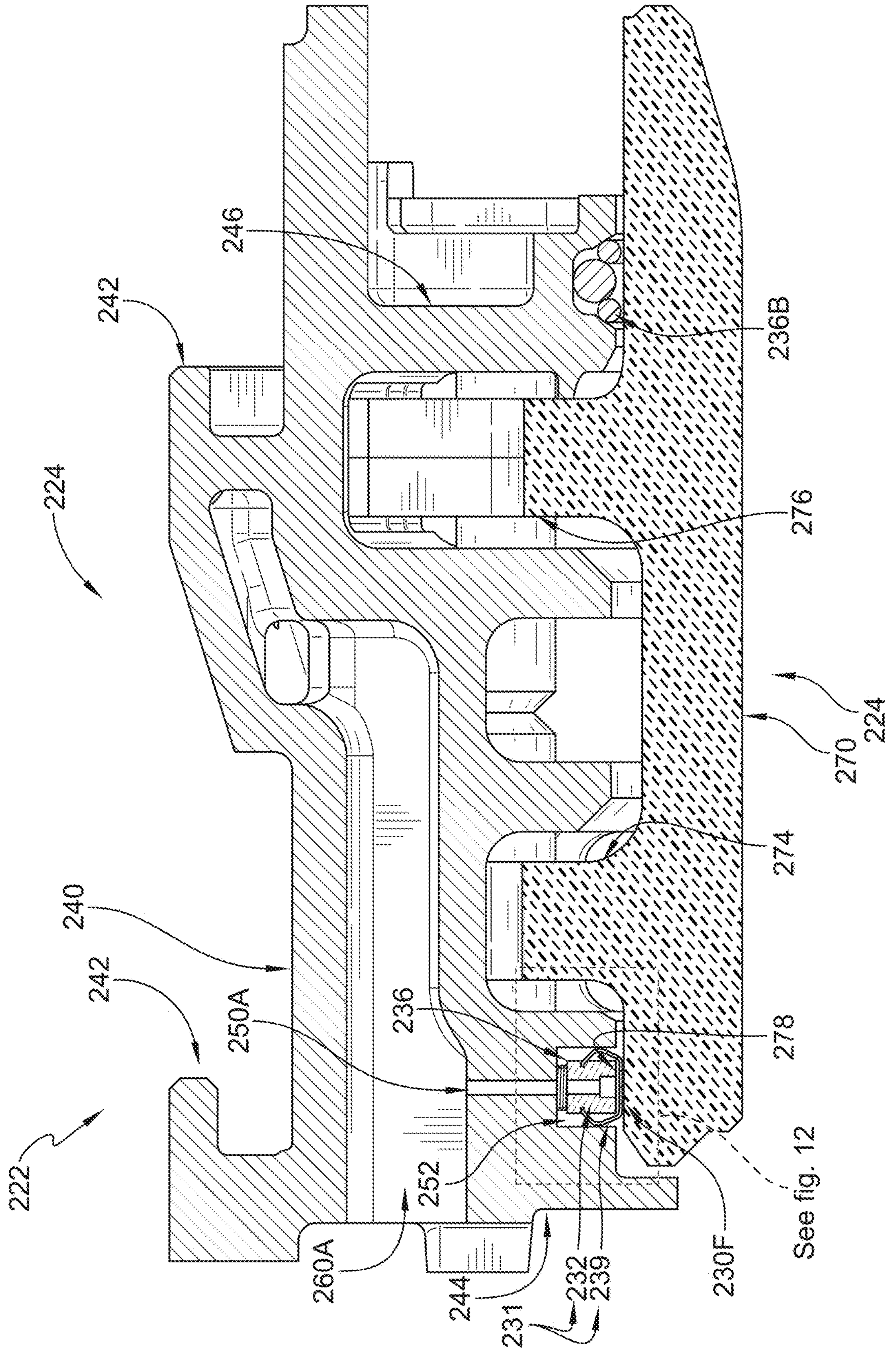
FIG. 11 is a cross-sectional view of the turbine shroud assembly of FIG. 10 showing the forward support wall of the carrier segment is formed to include the radially-inwardly opening first channel that receives the seal of the forward seal assembly and a buffer air passageway configured to discharge buffer air into the first channel to urge the seal radially inward into engagement with the blade track segment.
Figure 12:
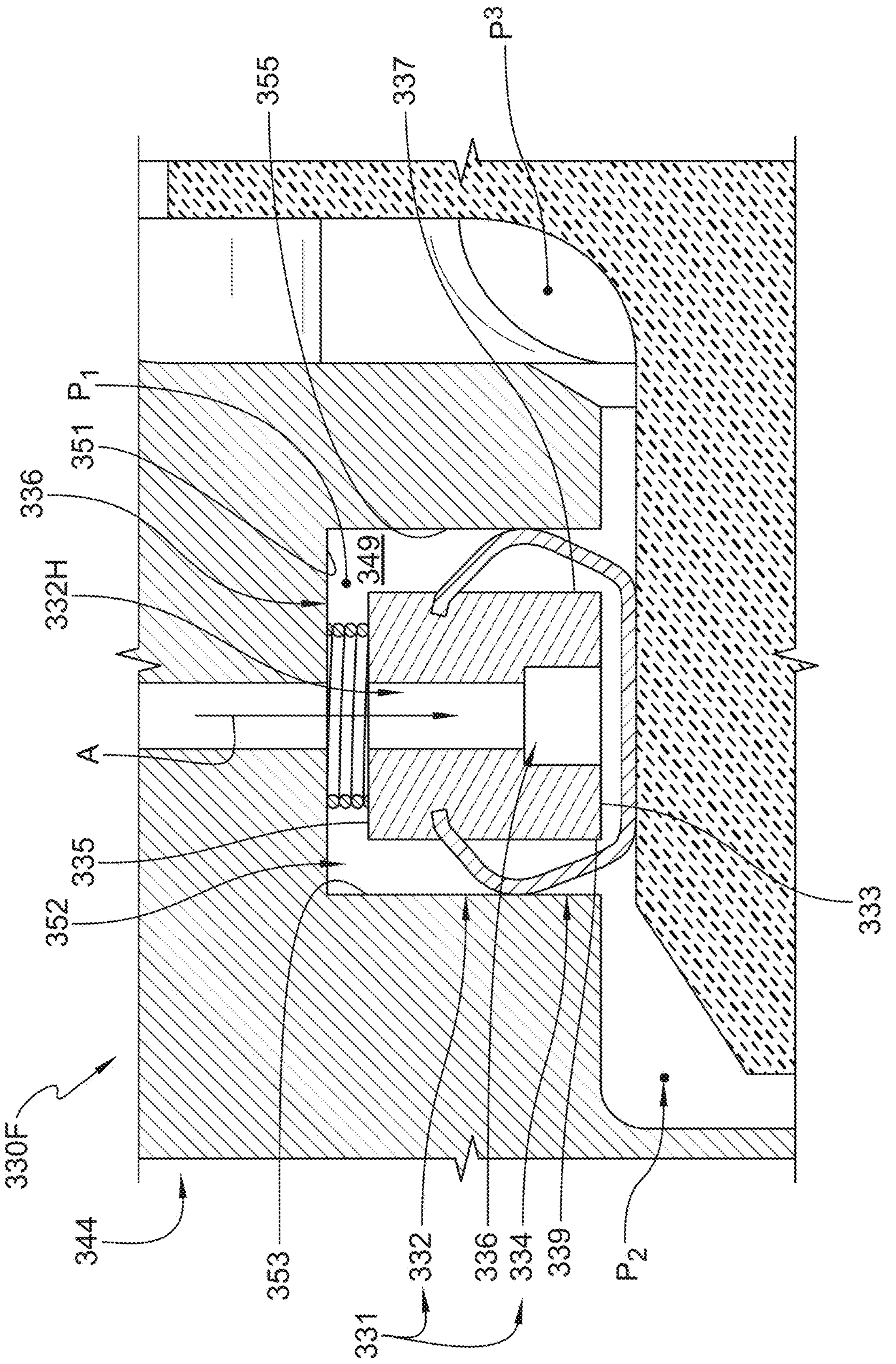
FIG. 12 is a detail view of FIG. 11 showing the forward seal assembly—also referred to as the buffer air seal assembly—includes the seal having a first seal member and a second U-shaped seal member that extends around the first seal member.

Another embodiment of a turbine shroud segment 322 in accordance with the present disclosure is shown in FIGS. 10-12. The turbine shroud segment 322 is substantially similar to the turbine shroud segment 22 shown in FIGS. 1-7 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 22.

The turbine shroud segment 322 includes a carrier segment 324 arranged circumferentially at least partway around an axis 11 of the gas turbine engine 10, a blade track segment 326 arranged circumferentially at least partway around the axis 11, and a seal system 330 as shown in FIGS. 10-12. The seal system 330 is configured to seal gaps between the carrier segment 324 and the blade track segment 326 to prevent or block gases from the gas path 25 of the gas turbine engine 10 from flowing between the carrier segment 324 and the blade track segment 326.

The seal system 330 includes forward seal assembly 330F located radially between the carrier segment 324 and the blade track segment 326 on a forward side of the blade track segment 326 and an aft seal assembly 330A located radially between the carrier segment 324 and the blade track segment 326 on an aft side of the blade track segment 326. The forward seal assembly 330F—also referred to as the buffer air seal assembly 330F—includes a seal 331 having a plurality of seal members 332, 334 and bias members 336.

The seal 331 includes a first seal member 332 and a second seal member 334 as shown in FIGS. 10-12. Each of the first and second seal members 332, 334 extend circumferentially relative to the axis 11. The second seal member 334 is arranged around the first seal member 332 so that the second seal member 334 is coupled with the first seal member 332. The seal 331 is pressure activated such that the first seal member 332 is urged radially inward, which causes the second seal member 334 to be urged into engage with the blade track segment 226.

The first seal member 332 has a rectangular cross-sectional shape when viewed in the circumferential direction as shown in FIGS. 10-12. The rectangular cross-sectional shape of the first seal member 232 defines an inner surface 333, an outer surface 335 spaced apart radially from the inner surface 333, and two side surfaces 337, 339 spaced apart axially that extend radially between the inner surface 333 and the outer surface 335. The second seal member 334 extends around a portion of the first seal member 332 so that the second seal member 334 engages the carrier segment 324 and the blade track segment 326 when the seal 331 is in the first channel 352.

The second seal member 334 includes an inner band 388, a first attachment arm 390, and a second attachment arm 392 as shown in FIGS. 10 and 12. The inner band 388 is arranged radially between the first seal member 332 and the shroud wall 370 of the blade track segment 326. The first attachment arm 390 extends from the inner band 388 around one side 339 of the first seal member 332 and the second attachment arm 392 extends from the inner band 388 opposite the first attachment arm 390 around the other side 337 of the first seal member 332. The first attachment arm 390 and the second attachment arm 392 may each extend into the first seal member 332 to couple the second seal member 334 with the first seal member 332.

The first attachment arm 390 extends radially outward and axially forward from the inner band 388 into engagement with the carrier segment 324. The first attachment arm 390 then bends back toward the first seal member 332 as shown in FIGS. 10-12. Similarly, the second attachment arm 392 extends radially outward and axially aft from the inner band 388 into engagement with the carrier segment 324. The second attachment arm 392 then bends back toward the first seal member 332 as shown in FIGS. 10-12. The inner band 388 is engaged with the shroud wall 370 of the blade track segment 326.

The first seal member 332 is formed to include an inner groove 333G and at least one through hole 332H as shown in FIGS. 10-12. The inner groove 333G extends radially into the inner surface 333 of the first seal member 332 and circumferentially relative to the axis 11. The through hole 332H extends radially through the first seal member 332 and opens into the inner groove 333G to allow the buffer air to flow through the first seal member 332 into the inner groove 333G. In the illustrative embodiment, the first seal member 332 is formed to include a plurality of through holes 332H as shown in FIG. 10. The through holes 332H are spaced apart circumferentially relative to the axis 11.

In the illustrative embodiment, the buffer air seal assembly 330F includes the seal 331 and at least one bias member 336 compressed radially between the carrier segment 324 and the seal 331 to apply a bias force to the seal 331 to bias the seal 331 radially inward towards the shroud wall 370 of the blade track segment 326 as shown in FIGS. 10-12. In some embodiments, the buffer air seal assembly 330F may include a plurality of bias members 336 spaced apart circumferentially relative to the axis 11 as shown in FIGS. 10-12.

Each of the bias members 336 is arranged radially between the carrier segment 324 and the first seal member 332 of the seal 331 to bias the seal 331 radially inward into engagement with the shroud wall 370 of the blade track segment 326. The bias member 336 or bias members 336 may be included to assist the pressure activation of the seal 331. The bias members 336 is located radially between the first seal member 332 and the carrier segment 324 to bias the first seal member 332 radially inward to cause the second seal member 334 to be urged radially inward into engagement with the blade track segment 326.

The first channel 352 is defined by a first end surface 351, a first—support-wall surface 353, and a second support-wall surface 355 as shown in FIG. 12. The first support-wall surface 353 extends radially inward from the first end surface 351. The second support-wall surface 355 extends radially inward from the first end surface 351 and spaced apart axially from the first support-wall surface 353. The first attachment arm 390 of the second seal member 334 engages the first support-wall surface 53 and the second attachment arm 392 of the second seal member 334 engages the second support-wall surface 55 as shown in FIG. 12.

The buffer air passageway 350A extends radially into the forward support wall 344 included in the carrier segment 324 and opens into the first channel 352. The buffer air passageway 350A discharges the buffer air into the buffer air cavity 349 defined between the surfaces 351, 353, 355 of the first channel 352 and the outer seal member 332A as shown in FIGS. 11 and 12. The buffer air discharged pressurizes the buffer air cavity 349 to urge the seal 331 radially inward into engagement with the blade track segment 326.

The carrier segment 324 includes an outer wall 340, a pair of hangers 342, a forward support wall 344, and an aft support wall 346 as shown in FIGS. 10-12. The outer wall 340 extends circumferentially at least partway about the axis 11. The forward support wall 344 extends radially inward from the outer wall 340 at a forward end of the outer wall 340 axially forward of the attachment flange 374 and the aft support wall 346 extends radially inward from the outer wall 340 at an aft end of the outer wall 340 axially aft of the attachment flange 376.

The forward support wall 344 of the carrier segment 324 includes the first channel 352 as shown in FIGS. 11 and 12. The forward support wall 344 is formed to include the first channel 352. The first channel 352 is radially-inwardly opening so that the channel 352 is open toward the blade track segment 326. In the illustrative embodiment, only the forward support wall 344 includes the buffer air passageway 350A as shown in FIGS. 11 and 12.

The blade track segment 326 includes the shroud wall 370 and the attachment flanges 374, 376 as shown in FIGS. 10-12. The shroud wall 370 that extends circumferentially partway around the axis 11. The first attachment flange 374 and the second attachment flange 376 each extend radially outward from the shroud wall 370. The second attachment flange 376 is spaced apart axially from the first attachment flange 374.

A method of assembling and using the turbine shroud segment 322 may include several steps. The method includes arranging the seal members 332A, 332B, 332C of the seal 331 of the forward seal assembly 330F in the first channel 352 before arranging the blade track segment 326 adjacent to the carrier segment 324. In the illustrative embodiment, the method includes arranging the bias member 336 or bias members 336 in the first channel 352 before arranging the seal 331 in the first channel 352.

The step of arranging the seal 331 in the first channel 352 may include arranging the second seal member 334 around the first seal member 332 before arranging both in the first channel 352 so that the bias member 336 is located radially between the carrier segment 324 and the first seal member 332. The seal 332 is arranged in the first channel 352 so that the attachment arms 390, 392 of the second seal member 334 engage the surfaces 353, 355 that define part of the first channel 352.

Once the seal 331 is arranged in the first channel 352, the blade track segment 326 is arranged adjacent to the carrier segment 324 so that the seal 331 of the forward seal assembly 330F is radially between the carrier segment 324 and the shroud wall 370 of the blade track segment 326 to block gases in the gas path from flowing between the carrier segment 324 and the blade track segment 326. In the illustrative embodiment, the blade track segment 326 is arranged adjacent to the carrier segment 324 so that the inner band 388 of the second seal member 334 engages the shroud wall 370 of the blade track segment 326.

The method further includes discharging a flow of buffer air through the at least one buffer air passageway 350A. The flow of buffer air is suggested by arrow A. The method may further include discharging the flow of buffer air through the plurality of buffer air passageways 350A. The method includes discharging the flow of buffer air through the buffer air passageway 350A radially inward away from the carrier segment 324 into the buffer air cavity 349 defined between the seal 331 and the first channel 352 formed in the carrier segment 324. The buffer air is discharged into the buffer air cavity 349 to urge the seal 331 radially inward into engagement with the blade track segment 326. The through holes 332H in the first seal member 332 allow a portion of the buffer air to flow through the first seal member 332 into the inner groove 333G.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a carrier segment arranged circumferentially at least partway around an axis, the carrier segment including an outer wall, a first support wall that extends radially inward from the outer wall, and a second support wall that extends radially inward from the outer wall at a location spaced apart axially from the first support wall to define an attachment-receiving space, and the first support wall formed to include a radially-inwardly opening first channel that extends circumferentially relative to the axis and at least one buffer air passageway that extends radially into the forward support wall and opens into the first channel, a blade track segment arranged circumferentially at least partway around the axis to define a portion of a gas path of the gas turbine engine, the blade track segment having a shroud wall that extends circumferentially partway around the axis and an attachment feature that extends radially outward from the shroud wall into the attachment-receiving space formed in the carrier segment, and a buffer air seal assembly arranged in the first channel between the forward support wall of the carrier segment and the shroud wall of the blade track segment to block gases from flowing between the carrier segment and the blade track segment, the buffer air seal assembly including a seal that extends circumferentially relative to the axis and axially across the first channel, wherein the at least one buffer air passageway is configured to discharge buffer air radially inward away from the carrier segment into the first channel to urge the seal radially inward into engagement with the shroud wall of the blade track segment, wherein the buffer air seal assembly further includes a bias member compressed radially between the carrier segment and the seal to apply a bias force to the seal to bias the seal radially inward towards the shroud wall of the blade track segment, and wherein the seal is formed to include an inner groove that extends radially inward into the seal and circumferentially relative to the axis and at least one through hole that extends radially through the seal and opens into the inner groove to allow the buffer air to flow through the seal into the inner groove.

2. The turbine shroud assembly of claim 1, wherein the seal includes a first seal member and a second seal member coupled to the first seal member for movement therewith, wherein the first seal member has a rectangular cross-sectional shape when viewed in the circumferential direction that defines an inner surface engaged with the shroud wall of the blade track segment, an outer surface spaced apart radially from the inner surface, and two side surfaces spaced apart axially that extend radially between the inner surface and the outer surface, and wherein the second seal member is arranged axially between a first side surface of the first seal member and the carrier segment.

3. The turbine shroud assembly of claim 2, wherein the first seal member is formed to include a side groove that extends axially into a first side surface of the first seal member and circumferentially relative to the axis and the second seal member is arranged in the side groove and engages the carrier segment in the first channel.

4. The turbine shroud assembly of claim 2, wherein the first seal member is formed to include the inner groove that extends radially into the inner surface of the first seal member and circumferentially relative to the axis and the at least one through hole that extends radially through the first seal member and opens into the inner groove to allow the buffer air to flow through the first seal member into the inner groove.

5. The turbine shroud assembly of claim 1, wherein the seal includes an outer seal member, a forward seal member that extends radially inward from the outer seal member, and an aft seal member that extends radially inward from the outer seal member, the aft seal member spaced apart axially from the forward seal member to define the inner groove therebetween, and the outer seal member, the forward seal member, and aft seal member are free to move relative to each other.

6. The turbine shroud assembly of claim 5, wherein the outer seal member is formed to include the at least one through hole that extends radially through the outer seal member and opens into the inner groove to allow the buffer air to flow through the outer seal member into the inner groove to urge the forward seal member axially forward and the aft seal member axially aft into engagement with the carrier segment.

7. The turbine shroud assembly of claim 1, wherein the seal includes a first seal member and a second seal member coupled to the first seal member for movement therewith, wherein the first seal member has a rectangular cross-sectional shape when viewed in the circumferential direction that defines an inner surface, an outer surface spaced apart radially from the inner surface, and two side surfaces spaced apart axially that extend radially between the inner surface and the outer surface, and wherein the second seal member extends around a portion of the first seal member so that the second seal member engages the carrier segment and the blade track segment.

8. The turbine shroud assembly of claim 7, wherein the first seal member is formed to include the inner groove that extends radially into the inner surface of the first seal member and circumferentially relative to the axis and the at least one through hole that extends radially through the first seal member and opens into the inner groove to allow the buffer air to flow through the first seal member into the inner groove.

9. The turbine shroud assembly of claim 1, wherein the first channel has a rectangular cross-sectional shape viewed circumferentially relative to the axis.

10. The turbine shroud assembly of claim 9, wherein the first channel defines a first end surface, a first support-wall surface that extends radially inward from the first end surface, and a second support-wall surface that extends radially inward from the first end surface at a location spaced apart axially from the first support-wall surface.

11. A turbine shroud assembly for use with a gas turbine engine, the turbine shroud assembly comprising:

a carrier segment arranged circumferentially at least partway around an axis, the carrier segment including an outer wall, a first support wall that extends radially inward from the outer wall, and a second support wall that extends radially inward from the outer wall at a location spaced apart axially from the first support wall to define an attachment-receiving space, and the first support wall formed to include a radially-inwardly opening first channel that extends circumferentially relative to the axis and at least one buffer air passageway that extends radially into the forward support wall and opens into the first channel, a blade track segment arranged circumferentially at least partway around the axis to define a portion of a gas path of the gas turbine engine, the blade track segment having a shroud wall that extends circumferentially partway around the axis and an attachment feature that extends radially outward from the shroud wall into the attachment-receiving space formed in the carrier segment, and a buffer air seal assembly arranged in the first channel between the forward support wall of the carrier segment and the shroud wall of the blade track segment to block gases from flowing between the carrier segment and the blade track segment, the buffer air seal assembly including a seal that extends circumferentially relative to the axis and axially across the first channel, wherein the at least one buffer air passageway is configured to discharge buffer air radially inward away from the carrier segment into the first channel to urge the seal radially inward into engagement with the shroud wall of the blade track segment, wherein the seal includes a first seal member and a second seal member coupled to the first seal member for movement therewith, wherein the first seal member has a rectangular cross-sectional shape when viewed in the circumferential direction that defines an inner surface engaged with the shroud wall of the blade track segment, an outer surface spaced apart radially from the inner surface, and two side surfaces spaced apart axially that extend radially between the inner surface and the outer surface, and wherein the second seal member is arranged axially between a first side surface of the first seal member and the carrier segment, and wherein the first seal member is formed to include an inner groove that extends radially into the inner surface of the first seal member and circumferentially relative to the axis and at least one through hole that extends radially through the first seal member and opens into the inner groove to allow the buffer air to flow through the first seal member into the inner groove.

12. The turbine shroud assembly of claim 11, wherein the first seal member is formed to include a side groove that extends axially into a first side surface of the first seal member and circumferentially relative to the axis and the second seal member is arranged in the side groove and engages the carrier segment in the first channel.

13. A method comprising:

providing a carrier segment arranged circumferentially at least partway around an axis, the carrier segment formed to include a radially-inwardly opening first channel and at least one buffer air passageway that extends radially into the carrier segment, providing a blade track segment arranged circumferentially at least partway around the axis, the blade track segment having a shroud wall that extends circumferentially partway around the axis and an attachment feature that extends radially outward from the shroud wall, and the shroud wall formed to include a radially-outwardly opening second channel, providing a buffer air seal assembly including a seal that extends circumferentially relative to the axis and at least one bias member, arranging the at least one bias member of the buffer air seal assembly in the first channel formed in the carrier segment, arranging the seal of the buffer air seal assembly in the first channel formed in the carrier segment so that the bias member is located radially between the carrier segment and the seal, arranging the blade track segment adjacent to the carrier segment so that the seal engages the shroud wall of the blade track segment, and discharging a flow of buffer air through the at least one buffer air passageway radially inward away from the carrier segment toward the seal to urge the seal radially inward into engagement with the blade track segment, wherein the seal is formed to include an inner groove that extends radially inward into the seal and circumferentially relative to the axis and at least one through hole that extends radially through the seal and opens into the inner groove to allow the buffer air to flow through the seal into the inner groove.

14. The method of claim 13, wherein the seal includes a first seal member and a second seal member, and wherein arranging the seal of the buffer air seal assembly in the first channel formed in the carrier segment includes arranging the second seal member in a side groove formed in the first seal member and arranging the first and second seal members in the first channel formed in the carrier segment after arranging the second seal member in the side groove of the first seal member.

15. The method of claim 13, wherein the seal includes an outer seal member, a forward seal member, and an aft seal member, and wherein arranging the seal of the buffer air seal assembly in the first channel formed in the carrier segment includes arranging the outer seal member in the first channel so that the at least one bias member is located radially between the carrier segment and the outer seal member, arranging the forward and aft seal members in the first channel after arranging the outer seal member in the first channel, and spacing the aft seal member apart axially from the forward seal member to define the inner groove therebetween.

16. The method of claim 13, wherein the seal includes a first seal member and a second seal member coupled to the first seal member for movement therewith, wherein the first seal member has a rectangular cross-sectional shape when viewed in the circumferential direction that defines an inner surface, an outer surface spaced apart radially from the inner surface, and two side surfaces spaced apart axially that extend radially between the inner surface and the outer surface, and wherein the second seal member extends around the inner surface of the first seal member.

17. The method of claim 13, further comprising providing at least one retainer and inserting the at least one retainer axially into the carrier segment and through the attachment feature of the blade track segment to couple the blade track segment to the carrier segment.

* * * * *